(12) United States Patent
Hirose et al.

(10) Patent No.: US 10,339,621 B2
(45) Date of Patent: Jul. 2, 2019

(54) OPERATOR MANAGEMENT DEVICE, OPERATOR MANAGEMENT SYSTEM, AND OPERATOR MANAGEMENT METHOD

(71) Applicant: Nissan Motor Co., Ltd., Kanagawa (JP)

(72) Inventors: Satoru Hirose, Kanagawa (JP); Satoshi Chinomi, Kanagawa (JP); Yukiko Nagai, Kanagawa (JP); Masaki Kuno, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 15/126,888

(22) PCT Filed: Mar. 19, 2014

(86) PCT No.: PCT/JP2014/057489
§ 371 (c)(1),
(2) Date: Sep. 16, 2016

(87) PCT Pub. No.: WO2015/140954
PCT Pub. Date: Sep. 24, 2015

(65) Prior Publication Data
US 2017/0091890 A1 Mar. 30, 2017

(51) Int. Cl.
*G06Q 10/00* (2012.01)
*G06Q 50/30* (2012.01)
(Continued)

(52) U.S. Cl.
CPC .......... *G06Q 50/30* (2013.01); *B60L 11/1824* (2013.01); *B60L 11/1861* (2013.01);
(Continued)

(58) Field of Classification Search
CPC . B60L 11/1824; B60L 11/1861; G06Q 10/02; G06Q 10/06311; G06Q 10/063118; G06Q 50/10; G06Q 50/30; G06Q 10/06
See application file for complete search history.

(56) References Cited

U.S. PATENT DOCUMENTS 5,422,822 A * 6/1995 Toyota .................. B60L 3/0046
702/63
5,487,002 A * 1/1996 Diller ...................... B60L 1/003
320/128
(Continued)

FOREIGN PATENT DOCUMENTS

CN 103299505 A 9/2013
EP 1067498 A1 1/2001
(Continued)

OTHER PUBLICATIONS

Mary Kihl and Duane Shinn (Improving Interbus Transfer with Automatic Vehicle Location) (Year: 1995).*
(Continued)

*Primary Examiner* — Hafiz A Kassim
(74) *Attorney, Agent, or Firm* — Osha Liang LLP

(57) ABSTRACT

An operator management device for managing work of an operator in a car sharing system that allows users to use shared vehicles allocated to stations includes a vehicle state acquisition unit configured to acquire state information of the shared vehicle, a transportation object vehicle specifying unit configured to specify a transportation object vehicle to be transported to a facility for restoring the shared vehicle so that the state information changes to a predetermined target value, on a basis of the state information of the shared vehicle and a utilization rate of the shared vehicle for rent at each station, and an operator management unit configured to generate an instruction of a task for the operator who
(Continued)

transports the specified transportation object vehicle to the facility and manage execution of the task.

7 Claims, 10 Drawing Sheets

(51) Int. Cl.
    *G06Q 50/10*     (2012.01)
    *G06Q 10/02*     (2012.01)
    *G06Q 10/06*     (2012.01)
    *B60L 11/18*     (2006.01)
    *G01S 19/14*     (2010.01)
    *B60L 53/30*     (2019.01)
    *B60L 58/12*     (2019.01)

(52) U.S. Cl.
    CPC ............... *B60L 53/30* (2019.02); *B60L 58/12* (2019.02); *G01S 19/14* (2013.01); *G06Q 10/02* (2013.01); *G06Q 10/06311* (2013.01); *G06Q 10/063118* (2013.01); *G06Q 50/10* (2013.01)

(56) References Cited

U.S. PATENT DOCUMENTS

| | | | | |
|---|---|---|---|---|
| 5,689,269 A * | 11/1997 | Norris | G01C 21/20 | 342/357.31 |
| 5,939,848 A * | 8/1999 | Yano | B60K 6/485 | 318/139 |
| 6,169,516 B1 * | 1/2001 | Watanabe | G01C 21/3635 | 340/995.14 |
| 6,793,027 B1 * | 9/2004 | Yamada | B60K 1/04 | 180/65.1 |
| 7,181,409 B1 | 2/2007 | Murakami et al. | | |
| 8,798,830 B2 * | 8/2014 | Sobue | B60K 16/00 | 701/22 |
| 9,139,091 B1 * | 9/2015 | Penilla | H04W 4/60 | |
| 9,860,708 B2 * | 1/2018 | Chavez | G01S 19/14 | |
| 2003/0195719 A1 * | 10/2003 | Emori | B60W 10/26 | 702/183 |
| 2005/0149250 A1 * | 7/2005 | Isaac | G01C 21/3679 | 701/32.3 |
| 2006/0247832 A1 * | 11/2006 | Taki | G06Q 10/02 | 701/31.4 |
| 2010/0280700 A1 * | 11/2010 | Morgal | G06Q 10/02 | 701/31.4 |
| 2011/0032110 A1 * | 2/2011 | Taguchi | B60L 3/12 | 340/636.1 |
| 2012/0004839 A1 * | 1/2012 | Mizuno | B60W 50/0097 | 701/123 |
| 2012/0136572 A1 * | 5/2012 | Norton | G01C 21/3407 | 701/465 |
| 2012/0143449 A1 * | 6/2012 | Chauncey | B60W 40/09 | 701/51 |
| 2012/0158229 A1 * | 6/2012 | Schaefer | B60L 11/1842 | 701/22 |
| 2012/0185379 A1 * | 7/2012 | Tu | B60L 11/1848 | 705/39 |
| 2012/0271547 A1 * | 10/2012 | Mori | B60L 11/184 | 701/527 |
| 2012/0306446 A1 * | 12/2012 | Suganuma | B60L 11/1824 | 320/109 |
| 2013/0218402 A1 * | 8/2013 | Hoshihara | B60L 11/1838 | 701/32.3 |
| 2013/0246102 A1 * | 9/2013 | Finegold | G06Q 10/025 | 705/5 |
| 2013/0285608 A1 * | 10/2013 | Jikihara | B60L 11/1838 | 320/109 |
| 2013/0289821 A1 | 10/2013 | Nakagawa | | |
| 2014/0005855 A1 * | 1/2014 | Hu | B60L 3/12 | 701/1 |
| 2014/0074329 A1 * | 3/2014 | Yang | B60L 11/1861 | 701/22 |
| 2014/0139354 A1 * | 5/2014 | Miyazaki | B60L 11/1816 | 340/902 |
| 2014/0143179 A1 * | 5/2014 | Takaoka | G06Q 50/06 | 705/412 |
| 2014/0214242 A1 * | 7/2014 | Seo | B60L 11/1861 | 701/2 |
| 2014/0232323 A1 * | 8/2014 | Jiang | B60L 11/1846 | 320/106 |
| 2014/0277844 A1 * | 9/2014 | Luke | G07C 5/008 | 701/2 |
| 2015/0094888 A1 * | 4/2015 | Hyde | B60L 11/1848 | 701/22 |
| 2016/0176306 A1 * | 6/2016 | Outwater | B60L 11/1825 | 320/138 |

FOREIGN PATENT DOCUMENTS

| | | |
|---|---|---|
| JP | 2002-304498 A | 10/2002 |
| JP | 2003-6295 A | 1/2003 |
| JP | 2010-231258 A | 10/2010 |
| JP | 2014-32460 A | 2/2014 |
| JP | 2014-41475 A | 3/2014 |

OTHER PUBLICATIONS

Jing Dong, and Zhenhong Lin (Within-day recharge of plug-in hybrid electric vehicles: Energy impact of public charging infrastructure, Transportation Research Part D 17 (2012) 405-412). (Year: 2012).*

International Preliminary Report on Patentability issued in corresponding Application No. PCT/JP2014/057489, dated Sep. 29, 2016 (9 pages).

* cited by examiner

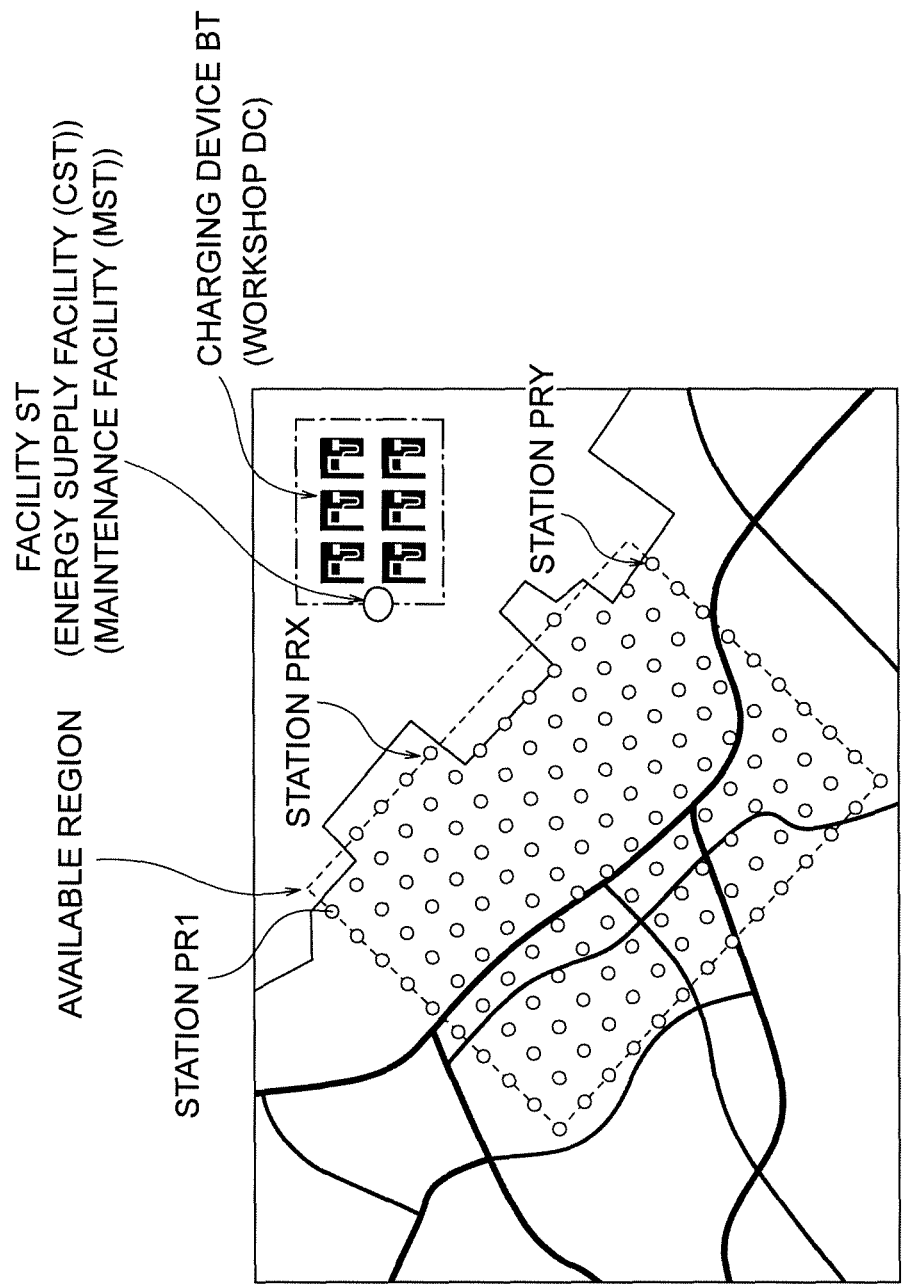

FIG. 3A 311 (31)

| VEHICLE ID | VEHICLE STATE MANAGEMENT INFORMATION | | | | | |
|---|---|---|---|---|---|---|
| | STATION/ PARKING LOT IDENTIFICATION INFORMATION | REMAINING AMOUNT OF ENERGY | VEHICLE CONDITION INFORMATION | UTILIZATION RATE OPERATION INFORMATION/ RESERVATION INFORMATION | UTILIZATION RATE OVER TIME/ OPERATION INFORMATION OVER TIME | UTILIZATION RATE INFORMATION |
| V1 | U1 | E1 | M1 | RV1 | P1 | Y/N |
| V2 | U2 | E2 | M2 | RV2 | P2 | Y/N |
| V3 | U3 | E3 | M3 | RV3 | P3 | Y/N |
| V4 | U4 | E4 | M4 | RV4 | P4 | Y/N |
| V5 | U5 | E5 | M5 | RV5 | P5 | Y/N |

FIG. 3B 312 (31)

| FACILITY IDENTIFICATION INFORMATION | FACILITY MANAGEMENT INFORMATION | | | |
|---|---|---|---|---|
| | WORKSHOP IDENTIFICATION INFORMATION | POSSIBLE START TIME OF CHARGING / MAINTENANCE | ESTIMATED FINISH TIME OF CHARGING/ MAINTENANCE | OPERATION RATE |
| ST1 | ST11~ST1n | T11 | T21 | P1 |
| ST2 | ST21~ST2n | T12 | T22 | P2 |
| ST3 | ST31~ST3n | T13 | T23 | P3 |
| ST4 | ST41~ST4n | T14 | T24 | P4 |
| ST5 | ST51~ST5n | T15 | T25 | P5 |

| CHARGER No. | VEHICLE No. | REMAINING CHARGE OF BATTERY | CHARGER STATE | CHARGING FINISH TIME | NAME OF OPERATOR IN CHARGE | OPERATOR STATE |
|---|---|---|---|---|---|---|
| No.1 | CS10 | 40% | CHARGING | 120 MINUTES REMAINING | A | CLEANING VEHICLE |
| No.2 | CS25 | 60% | CHARGING | 90 MINUTES REMAINING | B | IN RECOVERY WORK |
| No.3 | CS16 | 75% | CHARGING | 75 MINUTES REMAINING | C | WAITING |
| No.4 | CS40 | 50% | CHARGING | 100 MINUTES REMAINING | D | WAITING |
| No.5 | CS37 | 100% | CHARGING COMPLETED | 5 MINUTES PASSED | A | CLEANING VEHICLE |
| No.6 | (CS05) | (20%) | RESERVED | START 30 MINUTES LATER | B | IN RECOVERY WORK |
| No.7 | | | NOT USED | — | — | |
| No.8 | | | NOT USED | — | — | |

FIG. 3D 313 (31)

| OPERATOR ID | OPERATOR MANAGEMENT INFORMATION | | | | |
|---|---|---|---|---|---|
| | WORK SCHEDULE | | CURRENT POSITION | PROGRESS INFORMATION | PERSONNEL MANAGEMENT INFORMATION |
| | VEHICLE TRANSPORTATION SCHEDULE | MAINTENANCE WORK/ CHARGING WORK | | | |
| SF1 | SQ1 | SQ11 | M1 | D1 | AQ1 |
| SF2 | SQ2 | SQ2 | M1 | D2 | AQ2 |
| SF3 | SQ3 | SQ3 | M1 | D3 | AQ3 |
| SF4 | SQ4 | SQ4 | M1 | D4 | AQ4 |
| SF5 | SQ5 | SQ5 | M1 | D5 | AQ5 |

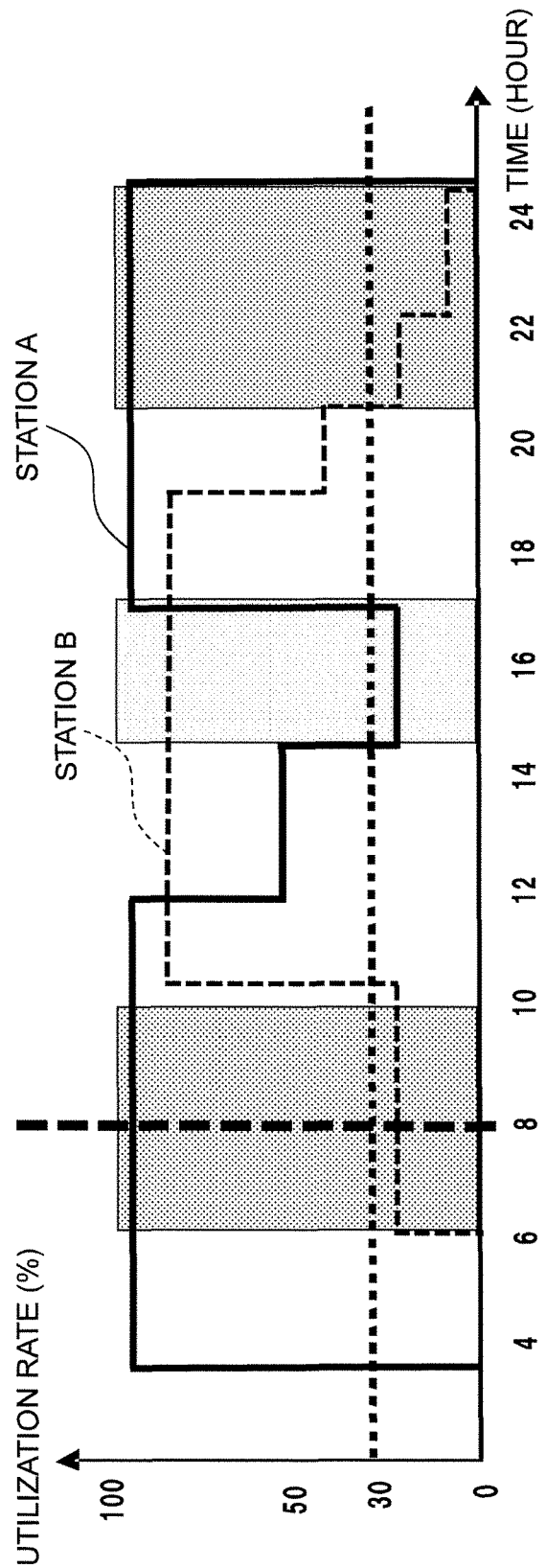

FIG. 5

K: RECOVERING  H: ALLOCATING  G: CHARGING  C: CLEANING

| OPERATOR | SCHEDULE | 5:00 | 6:00 | 7:00 | 8:00 | 9:00 | 10:00 | 11:00 | 12:00 | 13:00 | 14:00 | 15:00 | 16:00 | 17:00 | 18:00 | ⋯⋯ | 0:00 |
|---|---|---|---|---|---|---|---|---|---|---|---|---|---|---|---|---|---|
| OPERATOR A | WORKING HOURS | | | | | | | | | | | | | | | | |
| | OBJECT VEHICLE FOR WORK | | CS37 | | CS10 | | CS13 | | CS14 | | | | | | | | |
| | CONTENTS OF WORK | | G C | H | G C H | | K G C | | H | | | | | | | | |
| | RESERVED | | | CS37 | 001 | CS10 | | 002 | | | | | | | | | |
| OPERATOR B | WORKING HOURS | | | | | | | | | | | | | | | | |
| | OBJECT VEHICLE FOR WORK | | CS06 | CS25 | CS26 | CS27 | | | | | | | | | | | |
| | CONTENTS OF WORK | | G C | G C H | K | G C H | | | | | | | | | | | |
| | RESERVED | | | CS06 | 021 | | CS25 | 021 | | | | | | | | | |
| OPERATOR C | WORKING HOURS | | | | | | | | | | | | | | | | |
| | OBJECT VEHICLE FOR WORK | | | | | | CS31 | CS32 | CS32 | CS33 | CS34 | CS35 | | | | | |
| | CONTENTS OF WORK | | | | | | G C | G C | H | K | H | K | | | | | |
| | RESERVED | | | | | | CS31 | | 031 | CS32 | | 032 | | | | | |
| OPERATOR D | WORKING HOURS | | | | | | | | | | | | | | | | |
| | OBJECT VEHICLE FOR WORK | | | | | | | | CS41 | CS42 | CS43 | CS44 | | CS45 | CS46 | | |
| | CONTENTS OF WORK | | | | | | | | G C G | C | H | K | | G C | G C | | |
| | RESERVED | | | | | | | | CS41 | 031 | CS42 | | 032 | | | | |
| OPERATOR E | WORKING HOURS | | | | | | | | | | | | | | | | |
| | OBJECT VEHICLE FOR WORK | | | | | CS51 | CS52 | CS53 | | | CS54 | CS55 | | | | | |
| | CONTENTS OF WORK | | | | | C | G C H | K G C H | | | K G C H | H | | | | | |
| | RESERVED | | | | | | CS51 | 051 | | | 052 | | | | | | |

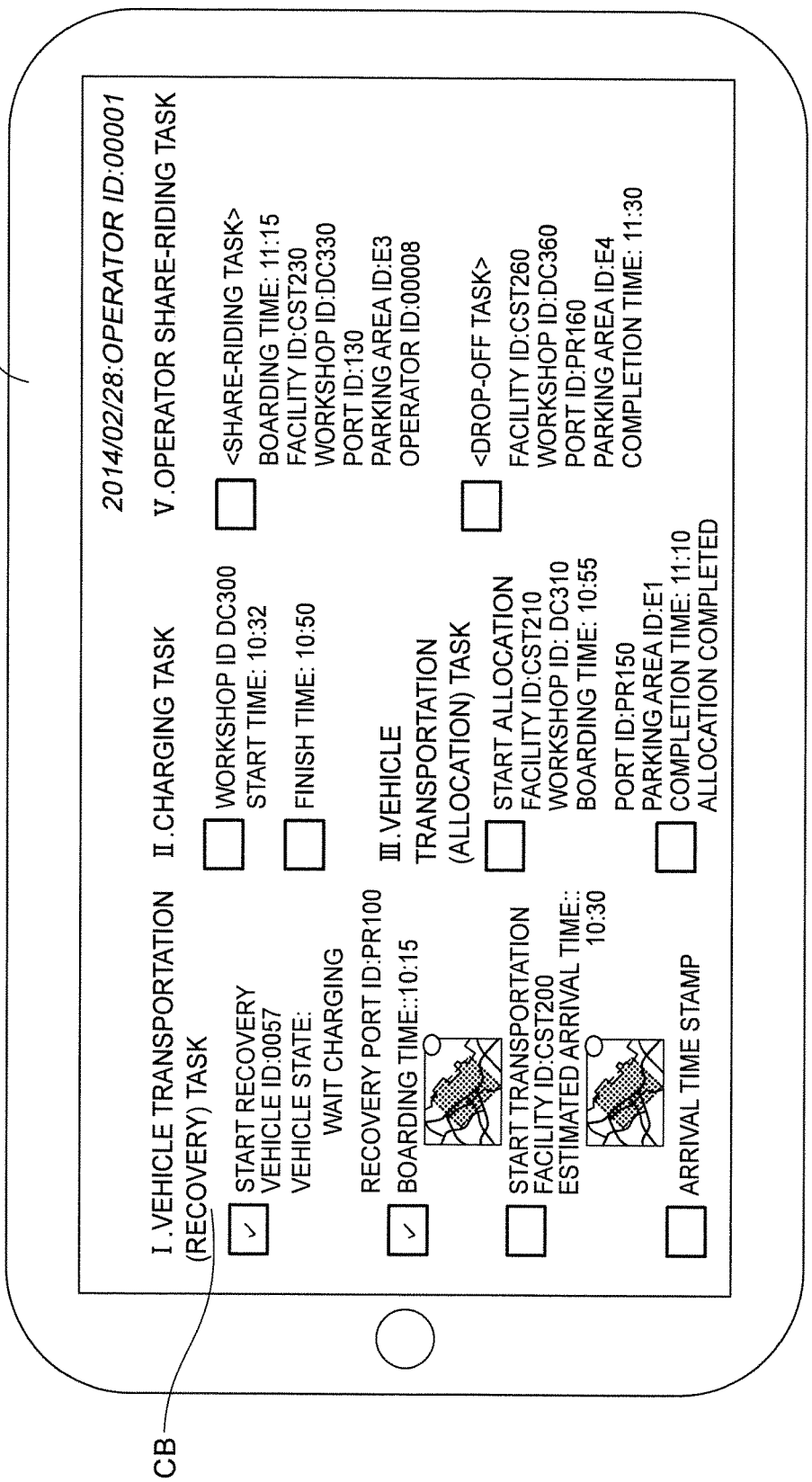

OPERATOR MANAGEMENT DEVICE, OPERATOR MANAGEMENT SYSTEM, AND OPERATOR MANAGEMENT METHOD

BACKGROUND

Technical Field

The present invention relates to an operator management device, an operator management system, and an operator management method for managing work of an operator who engages in the operation of a car sharing system that allows users to use shared vehicles.

Related Art

With regard to an operator management device, a battery charging system is known which combines a charging schedule of each electric car and a vehicle operation schedule of the electric car to efficiently use electric cars in an adjusted schedule (Patent Document 1).

Patent Document 1: JP 2010-231258 A

SUMMARY

In an one-way type car sharing system in which a shared vehicle rented at a station is returned to another station, an operator transports the shared vehicle returned to each station to a facility such as a charging station and reallocates the shared vehicle after charging to each station. During this work, the user cannot use the shared vehicle, and therefore the operation rate of the shared vehicle may possibly be low depending on the timing of transportation.

In a conventional battery charging system, however, the timing the operator transports the shared vehicle is not taken into account. Thus, unfortunately, the operation rate of the shared vehicle cannot be improved.

One or more embodiments of the present invention improves the operation rate of the shared vehicle by managing the work of the operator so that the operator transports the shared vehicle to the facility at appropriate timing.

According to one or more embodiments of the present invention, in a car sharing system that allows users to use shared vehicles allocated to stations, an object vehicle to be transported to a facility is specified on the basis of state information of the shared vehicle and a utilization rate of the shared vehicle for rental at the station. An operator is made to transport the object vehicle to a specified facility.

According to one or more embodiments of the present invention, the shared vehicle can be transported at appropriate timing by specifying the shared vehicle on the basis of the state information and the utilization rate of the shared vehicle and making the operator transport the specified, shared vehicle. This allows may allow the state of the shared vehicle to be good and avoids the occurrence of a trouble that the user cannot use the shared vehicle. As a result, the operation rate of the shared vehicle may be improved.

BRIEF DESCRIPTION OF DRAWINGS

FIG. 2 is a view illustrating stations and facilities for shared vehicles to which the operator management system according to one or more embodiments of the present invention is applied.

FIG. 3A is a view illustrating an example of management information regarding the shared vehicles according to one or more embodiments of the present invention.

FIG. 3B is a view illustrating an example of management information regarding the facilities according to one or more embodiments of the present invention.

FIG. 3C is a view illustrating an example of management information regarding the chargers of a facility according to one or more embodiments of the present invention.

FIG. 3D is a view illustrating an example of management information regarding the work of each operator according to one or more embodiments of the present invention.

FIG. 4 is a view illustrating an example of the variation over time of the utilization rate of each station according to one or more embodiments of the present invention.

FIG. 5 is a view illustrating an example of an operator schedule according to one or more embodiments of the present invention.

FIG. 6 is a view illustrating an example of presentation information for the user terminal device according to one or more embodiments of the present invention.

DETAILED DESCRIPTION

Hereinafter, the operator management device according to embodiments of the present invention will be described with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. In one or more of the embodiments, the operator management device will be described using an example of an operator management device that manages operators of a car sharing system. The car sharing system according to one or more embodiments of the present invention allows users to use shared vehicles allocated to stations. According to one or more embodiments of the present invention, a drop off-type one-way car sharing system is provided in which the user is permitted to return the shared vehicle rented at a first station to a second station.

Figure 1:
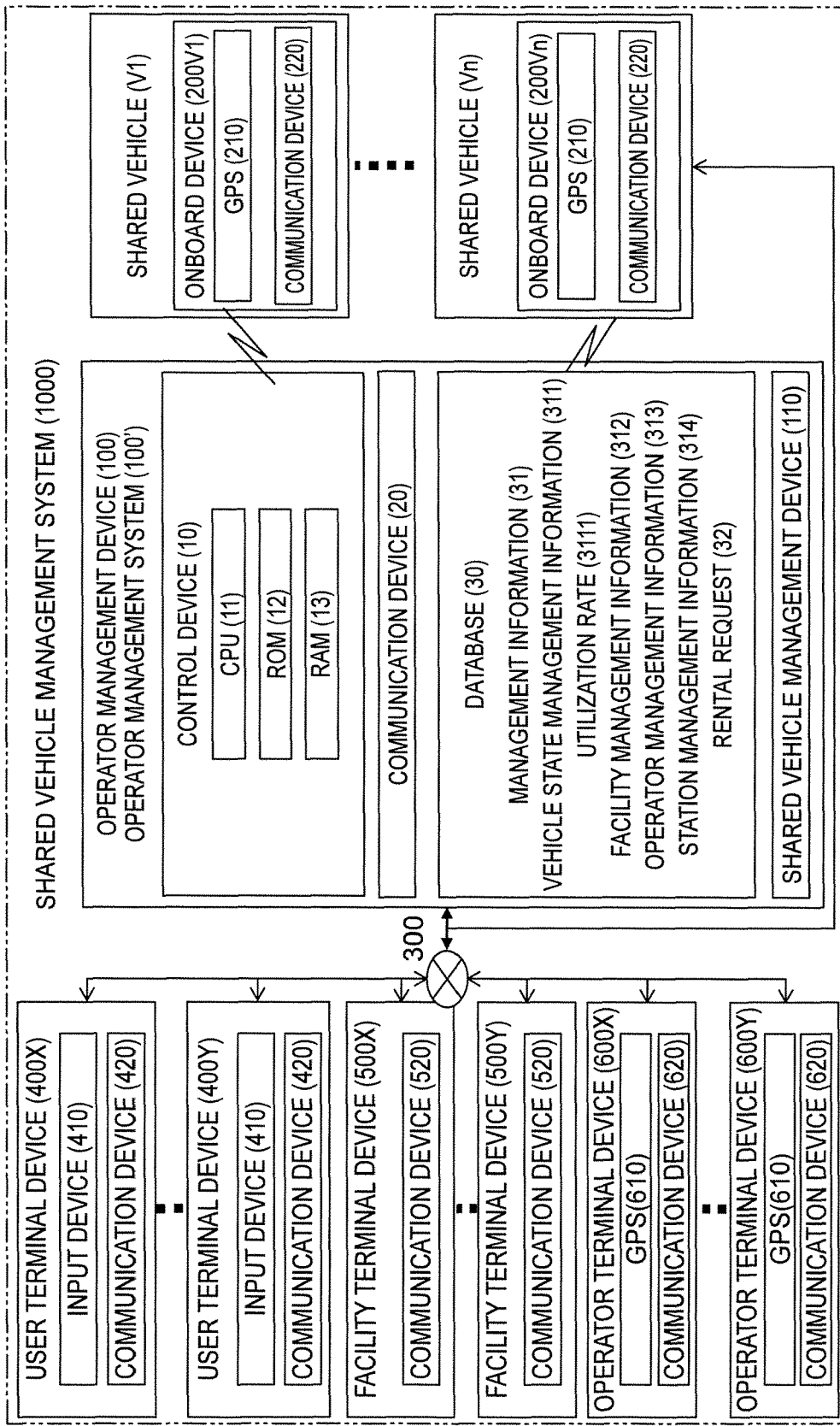
FIG. 1 is a block diagram of an operator management system comprising an operator management device according to one or more embodiments of the present invention.

FIG. 1 is a block diagram of an operator management system 1000 that manages the car sharing system according to one or more embodiments of the present invention. FIG. 1 is also a block diagram of an operator management device 100 that manages the work of each operator who engages in provision of the car sharing system.

As illustrated in FIG. 1, the operator management system 1000 according to one or more embodiments of the present invention has the operator management device 100, a shared vehicle management device 110, onboard devices 200V1 to 200Vn (which may be collectively referred to as an "onboard device 200Vn," hereinafter) carried respectively by shared vehicles V1 to Vn (which may be collectively referred to as a "shared vehicle Vn" or "shared vehicles Vn," hereinafter) used by the users, user terminal devices 400X to 400Y (which may be collectively referred to as a "user terminal device 400X," hereinafter) carried by the users, facility terminal devices 500X to 500Y (which may be collectively referred to as a "facility terminal device 500X," hereinafter) disposed at respective facilities that perform energy resupply and/or maintenance for the shared vehicles Vn (the maintenance includes check and repair, here and hereinafter), and operator terminal devices 600X to 600Y (which may be collectively referred to as an "operator terminal device 600X," hereinafter) carried by operators who perform operation as for transportation of the shared vehicles Vn in the car sharing system. Although not illustrated, the operator management system 1000 according to one or more embodiments of the present invention may include station terminal devices 700X to 700Y provided at respective stations PR to which the shared vehicles Vn are allocated. The numbers of the onboard devices 200V1 to 200Vn, user terminal devices 400X to 400Y, facility terminal devices 500X to 500Y, operator terminal devices 600X to 600Y, and station terminal devices 700X to 700Y, which constitute the operator management system 1000 according to one or more embodiments of the present invention, are not limited.

The operator management device 100, onboard devices 200V1 to 200Vn, user terminal devices 400X to 400Y, facility terminal devices 500X to 500Y, and operator terminal devices 600X to 600Y include respective communication devices (20, 220, 420, 520, and 620) and can exchange information with one another, such as via the Internet 300. The communication path may be wired or wireless. The operator management device 100 can communicate with the onboard devices 200V1 to 200Vn, user terminal devices 400X to 400Y, and operator terminal devices 600X to 600Y via the facility terminal devices 500X to 500Y and station terminal devices 700X to 700Y.

The user terminal device 400X according to one or more embodiments of the present invention is a computer comprising: a ROM (Read Only Memory) that stores programs applied to the user terminal device 400X according to one or more embodiments of the present invention; a CPU (Central Processing Unit) as an operation circuit that executes the programs stored in the ROM to perform each function; and a RAM (Random Access Memory) that functions as an accessible storage device. The user terminal device 400X according to one or more embodiments of the present invention may be a personal computer, smartphone, PDA (Personal Digital Assistant), or other handheld terminal device. The user terminal device 400X according to one or more embodiments of the present invention includes a communication device 420 that performs communication with external devices such as the operator management device 100.

The operator terminal device 600X according to one or more embodiments of the present invention is a computer comprising: a ROM (Read Only Memory) that stores programs applied to the operator terminal device 600X according to one or more embodiments of the present invention; a CPU (Central Processing Unit) as an operation circuit that executes the programs stored in the ROM to perform each function; and a RAM (Random Access Memory) that functions as an accessible storage device. The operator terminal device 600X according to one or more embodiments of the present invention includes a GPS (Global Positioning System) receiver 610 and a communication device 620 that performs communication with external devices such as the operator management device 100. The current position of the operator detected by the GPS receiver is transmitted to the operator management device 100 via the communication device 620. The operator terminal device 600X according to one or more embodiments of the present invention may be a personal computer, smartphone, PDA (Personal Digital Assistant), or other handheld/portable terminal device.

Each of the onboard devices 200V1 to 200Vn according to one or more embodiments of the present invention includes a GPS (Global Positioning System) receiver 210 to detect the current position of each shared vehicle Vn and transmits the position of the vehicle to the operator management system 1000 via a communication device 220.

The shared vehicle management device 110 according to one or more embodiments of the present invention accepts rental of a shared vehicle Vn available from one station PR to a user on the basis of a rental request that is input via the user terminal device 400X, and also accepts a return of the shared vehicle Vn from the user at another station PR. The shared vehicle management device 110 records execution of the rental and return of the shared vehicle Vn to a database 30.

The shared vehicles Vn used in one or more embodiments of the present invention may be electric vehicles (EVs) that are driven by electricity stored in batteries. The shared vehicles Vn are not limited to electric vehicles and may be hybrid vehicles that utilize electricity or other vehicles, such as gasoline-fueled vehicles, fuel-cell vehicles, alcohol-fueled vehicles, and hydrogen-fueled vehicles.

FIG. 2 is a view illustrating stations PR of the car sharing system in which the operator management device 100 according to one or more embodiments of the present invention is used. The stations PR are provided at points within a predetermined region for use (region represented by broken lines in the figure) on a map. In FIG. 2, the stations PR are represented by circles. In the car sharing system according to one or more embodiments of the present invention, an example is illustrated in which each station PR is provided at the intersection of two orthogonal lines on the map, but the arrangement of the stations PR is not particularly limited. In the example illustrated in FIG. 2, the stations PR are arranged such that the distance between two adjacent stations PR is equal, but the arrangement of the stations PR is not limited to this. The car sharing system according to one or more embodiments of the present invention does not obligate the user to return the shared vehicle Vn to the location at which the shared vehicle Vn is rented, and is a drop off-type car sharing system which permits the user to return the shared vehicle Vn to a different location than the location at which the shared vehicle Vn is rented. The user can rent a shared vehicle Vn at a station for rental PR1 and return the shared vehicle Vn at a different desired station for return PRX or PRY.

In the car sharing system according to one or more embodiments of the present invention, state information of the shared vehicle Vn is changed to a predetermined target value at a facility ST. The state information and the predetermined target value according to one or more embodiments of the present invention are information that represents a remaining amount of energy or a management state.

In the car sharing system according to one or more embodiments of the present invention, the charging (energy supply) for the shared vehicles Vn allocated to the stations PR is collectively performed at an energy supply facility CST such as a collective charging station, and the remaining battery charge (remaining amount of energy) of the shared vehicle Vn is changed to a predetermined target value. This allows the energy state of the shared vehicle Vn to be corrected to an appropriate state. The energy supply facility CST is provided with a plurality of charging devices BT each of which includes a workshop DC having a space for charging the shared vehicle Vn. The shared vehicle Vn for which the charging (energy supply) is completed is allocated again to each station PR.

In the car sharing system according to one or more embodiments of the present invention, the maintenance for the shared vehicles Vn allocated to the stations PR is collectively performed at a maintenance facility MST such as a collective maintenance station, and maintenance state information (such as air pressure of tires and cleaning state) of the shared vehicle Vn is changed to a predetermined target value. This allows the maintenance state of the shared vehicle Vn to be in an appropriate state. The maintenance facility MST is a facility for performing maintenance operations including check and repair for the shared vehicles Vn. The maintenance facility MST includes a plurality of workshops DC each of which has a maintenance device MM and a space for performing maintenance processes such as check and repair for the shared vehicles Vn. The shared vehicle Vn after being corrected to an appropriate state is allocated again to each station PR.

In the car sharing system according to one or more embodiments of the present invention, an operator as an employee is responsible for transporting a shared vehicle Vn which needs energy supply and/or maintenance from each station PR to a facility such as the energy supply facility CST and maintenance facility MST. Similarly, the operator is responsible for transporting the shared vehicle Vn for which the energy supply and maintenance are completed from a facility such as the energy supply facility CST and maintenance facility MST to each station PR. The work for "transporting" the shared vehicle Vn includes a "forwarding work" for transporting the shared vehicle Vn from each station PR to a facility such as the energy supply facility CST and maintenance facility MST and an "allocating work" for transporting the shared vehicle Vn for which the energy supply and maintenance are completed from a facility such as the energy supply facility CST and maintenance facility MST to each station. The cost in association with the work of the operator is accounted for as the operational cost of the car sharing system.

Referring again to FIG. 1, the operator device 100 according to one or more embodiments of the present invention comprises: a control device 10 that executes a control process for managing the work of each operator engaged in the car sharing system; a communication device 20; and a database 30. The operator management device 100 functions as a server for the operator terminal device 600X, facility terminal device 500X, onboard device 200Vn, and user terminal device 400X in the operator management system 1000.

The database 30 according to one or more embodiments of the present invention stores management information 31 and a rental request 32 received from the user. The management information 31 includes vehicle state management information 311, facility management information 312, operator management information 313, and station management information 314.

Each information item will be described below.

The vehicle state management information 311 includes state information of the shared vehicles Vn, a utilization rate based on operation information of the shared vehicles Vn, and other information regarding the shared vehicles Vn. FIG. 3A illustrates an example of the vehicle state management information 311. As illustrated in the figure, the vehicle state management information 311 includes specific information (vehicle ID) of each shared vehicle Vn, identification information that identifies the station PR and parking area in the station PR at which the shared vehicle Vn is located (or to be located), information that represents the remaining amount of energy of the shared vehicle Vn and the maintenance state of the shared vehicle Vn, operation information and/or reservation information of the shared vehicle Vn, information that represents a utilization rate obtained on the basis of the above information items and variation of the utilization rate/operation state over time, and information that represents whether or not the shared vehicle Vn can be rented.

The facility management information 312 includes operation state and other information of the facilities such as the energy supply facility CST and maintenance facility MST. The facility management information 312 is information that is acquired by the management server of the energy supply facility CST such as a charging station and the management server of the maintenance facility MST such as a maintenance station and manages the state of each facility in an integrated manner. FIG. 3B illustrates an example of the facility management information 312. As illustrated in the figure, the facility management information 312 includes information that identifies the facility and information that specifies the workshop DC (an area at which energy supply or maintenance is performed) which belongs to the facility. The facility management information 312 may be organized for each facility or organized for each workshop DC. According to the facility management information 312, when the shared vehicle Vn enters each facility or each workshop DC and when the shared vehicle Vn leaves there can be made clear. The facility management information 312 includes the operation state of each device which is acquired from the energy supply device (charger) of the energy supply facility CST such as a charging station. For example, the facility management information 312 includes availability of each energy supply device (charger), the amount of energy of the shared vehicle Vn being supplied with energy (being charged), and an estimated time when the energy supply (charging) is completed. Each facility terminal device 500X estimates the time when the energy supply (charging) is completed, on the basis of the state of the shared vehicle Vn to be supplied with energy. Each facility terminal device 500X calculates the time required for power feeding from the chargeable electric energy which is obtained on the basis of the degradation level of the battery of the shared vehicle Vn, the number of times of charging the battery, etc. The same is true for the maintenance facility. The facility terminal device 500X of the energy supply facility CST provides the operation state of the facility such as the energy supply facility CST and maintenance facility MST to the operator management device 100.

FIG. 3C is a view illustrating an example of an operation state 312A of each charger (workshop DC) in the facility CST. As illustrated in FIG. 3C, the operation state 312A of each charger (workshop DC) includes the identification number (No.) of the shared vehicle Vn to be charged, the remaining charge of battery, the state of charger, the estimated time at which the charging is completed, information that specifies the operator in charge (such as the name and employee number of the operator in charge), and information that represents the state of the operator in the facility CST.

The operator management information 313 is information that represents the management state of each operator who transports the shared vehicle Vn to perform charging, maintenance, etc. The operator management information 313 includes a schedule for each operator which represents the task for the operator and the task over time and other information regarding the operator. The control device 10 identifies each operator who engages in the operation of the car sharing system. The control device 10 is provided with the management information 31 including the operator management information 313 so that the control device 10 can refer to the management information 31. The operator management information 313 includes an operator schedule.

The operator schedule includes a transportation schedule that defines when, from where, and to where, a certain operator transports which shared vehicle Vn, and a work schedule for the same or different operator to perform charging and/or maintenance of the shared vehicle Vn after transportation. The control device 10 acquires the vehicle state of each shared vehicle Vn and determines the facility (energy supply facility CST/maintenance facility MST) to which the shared vehicle Vn should be transported and the time when the shared vehicle Vn should be transported.

FIG. 3D illustrates an example of the operator management information 313. As illustrated in the figure, the operator management information 313 includes information that specifies the operator, the schedule of vehicle transportation by each operator, the schedule of maintenance work/charging work, the current position of each operator, progress information for the schedule for each operator, and personnel management information of each operator. The vehicle transportation schedule is defined such that the operator ID which identifies each operator is associated with the vehicle transportation schedule for the operator who transports the shared vehicle Vn. The vehicle transportation schedule includes the carry-out start time/carry-in completion time for the shared vehicle Vn, the station PR for rental of the shared vehicle Vn, the specific information of the shared vehicle Vn, and the carry-in station PR and parking area for the shared vehicle Vn. The operator schedule is defined so as to be associated with the schedule of work to be performed for the shared vehicle Vn for each operator ID which identifies the operator. Examples of the work may include energy supply work such as charging, maintenance work such as tire replacement, air pressure adjustment for tires, vehicle wash and vehicle interior cleaning, and check work such as a check of the vehicle control circuit, a program check for the onboard device and a lighting check.

The operator management information 313 includes the current position of the operator. This current position is represented by positional information detected by the GPS receiver of the operator terminal device 600X. According to this positional information, the current position and the history of locations of the operator can be known. The operator management information 313 also includes progress information of the work by the operator. The progress information is information that is transmitted from the operator terminal device 600X carried by each operator and reports the progress of each work. For example, the progress information associates the states of starting transportation, ending transportation, being in transportation, being in the charging work, being in cleaning up, being on a break, etc. with the time of each state. The operator management information 313 includes personnel management information. The personnel management information includes the working day, working hours, break time and the like of each operator. The control device 10 refers to the position of the shared vehicle Vn and the operator schedules, which include the current positions of the operators, and detects an operator who is located near the shared vehicle Vn as the object of transportation, at the timing of specifying the transportation object vehicle. The control device 10 makes the operator transport the shared vehicle Vn specified as the object of transportation. Thus, the schedule over time is planned for each operator thereby to allow the operator to perform the task without any loss.

The control device 10 of the operator management device 100 according to one or more embodiments of the present invention comprises: a ROM (Read Only Memory) 12 that stores programs for executing a process to manage the work of each operator who performs a task as for the car sharing system; a CPU (Central Processing Unit) 11 as an operation circuit that executes the programs stored in the ROM 12 to function as the operator management device 100; and a RAM (Random Access Memory) 13 that functions as an accessible storage device.

The control device 10 of the operator management device 100 according to one or more embodiments of the present invention realizes a vehicle state acquisition function, a transportation object specifying function, and an operator management function. The control device 10 of the operator management device 100 according to one or more embodiments of the present invention also realizes a rental request acquisition function. In this rental request acquisition function, the control device 10 may acquire the rental request, which is acquired by the shared vehicle management device 110, via the shared vehicle management device 110. The shared vehicle management device 100 according to one or more embodiments of the present invention is a computer that realizes each function by cooperation of software for achieving the above functions and the above-described hardware.

Each function realized by the control device 10 of the operator management device 100 will be described below.

First, the vehicle state acquisition function executed by the control device 10 according to one or more embodiments of the present invention will be described. The control device 10 of the operator management device 100 according to one or more embodiments of the present invention acquires the state information of each shared vehicle Vn. The state information of the shared vehicle Vn according to one or more embodiments of the present invention includes the remaining amount of energy that drives the shared vehicle Vn. The remaining amount of energy in one or more embodiments of the present invention is the remaining amount in the power source which is installed on the shared vehicle Vn and drives the shared vehicle Vn, such as the remaining charge of battery, the remaining amount of gasoline, the remaining charge of fuel cells, the remaining amount of hydrogen gas, and the remaining amount of alcohol fuel. The control device 10 acquires the remaining amount of energy, which is detected by an energy amount sensor provided in the onboard device 200Vn of the shared vehicle Vn, via the communication device 20. In addition, the control device 10 may acquire information, such as the period of use of battery, the number of times of charging, the number of times of rapid charging, temperature, and presence or absence of the use of air conditioner, as an index for evaluating the current capacity of battery and the cruising range from the onboard device 200Vn of the shared vehicle Vn.

The state information of each shared vehicle Vn according to one or more embodiments of the present invention includes information on the maintenance state of the shared vehicle Vn. The maintenance state of the shared vehicle Vn in one or more embodiments of the present invention includes information as to whether or not the shared vehicle Vn needs maintenance. The maintenance state of the shared vehicle Vn includes the self-diagnosis result of abnormality of the shared vehicle Vn and the self-diagnosis result of the time for maintenance. When an abnormality determination device of the shared vehicle Vn determines that the vehicle is in a state that is not normal (in an abnormal state), this fact is output as the state information. The control device 10 acquires the output of the abnormality determination device provided in the onboard device 200Vn of the shared vehicle Vn, the output of a timer that self-diagnoses the time for check, and the output of a travel distance calculation device that self-diagnoses the time for check via the communication device 20.

The control device 10 according to one or more embodiments of the present invention stores the acquired state information of the shared vehicle Vn in the database 30 as the vehicle state management information 311 which is a part of the management information 31. Although not particularly limited, the control device 10 stores the identification information of the station PR/parking area to which each shared vehicle Vn is allocated, the remaining amount of energy such as the remaining charge of battery of the shared vehicle Vn, the maintenance state of the shared vehicle Vn, the operation information/reservation information of the shared vehicle Vn, and the utilization rate based thereon so that they are associated with the vehicle ID (ID is the identification information, here and hereinafter), as illustrated in FIG. 3A.

In the vehicle state management information 311, the identification information of the shared vehicle Vn to which the station PR of allocation is attached is stored so as to be associated with the operation rate over time at the station PR. The operation rate of the shared vehicle Vn at each station PR varies because the movement of the user who uses the shared vehicle Vn varies over time. In addition, the operation rate of the shared vehicle Vn varies in accordance with the positional relationship between stations PR and the ambient environment. As an example, when the distance between stations PR is large, the operation rate tends to increase because the users rush to each station PR. As another example, when a shopping center, station, school and the like are located near the station PR, the operation rate also tends to increase because of the rise of needs for use. From the variation information of the operation rate over time at each station PR, the control device 10 estimates when the operation rate of the shared vehicle Vn at each station PR is high and when the operation rate is low. The control device 10 refers to this operation rate to allow efficient allocation of the shared vehicle Vn to each station PR.

The vehicle state management information 311 of the management information 31 also includes rent-ability information that represents whether the shared vehicle Vn is in a rentable state or is not in a rentable state. When the remaining amount of energy of the shared vehicle Vn is less than a predetermined remaining amount threshold and/or when the maintenance state information of the shared vehicle Vn is not within (is outside) a predefined appropriate range in which the management is not needed (when management is needed), rental of the shared vehicle Vn is prohibited.

Next, the rental request acquisition function executed by the control device 10 according to one or more embodiments of the present invention will be described. The user activates the communication device 420 of the user terminal device 400X to access the operator management device 100 and search for the shared vehicle Vn which can be reserved, and transmits a rental request 32 to rent the shared vehicle Vn. On the other hand, the control device 10 according to one or more embodiments of the present invention acquires, from the user via the user terminal device 400X, the rental request that the user desires use of the shared vehicle Vn. The rental request 32 may be a request for an immediate use by which the user can start to use the shared vehicle Vn immediately after the request or a request for a reservation of use by which the user can start to use the shared vehicle Vn from the time and date the user specifies. The control device 10 according to one or more embodiments of the present invention stores the contents of the acquired rental request in the database 30. The shared vehicle Vn of which the use is requested has to be allocated to the reserved station PR before the reserved time after completing the work.

The rental request according to one or more embodiments of the present invention includes "rental information" that requests use of the shared vehicle Vn. The "rental request" may include "return information" that includes the specific information of a desired station for return PR to which the user desires to return the shared vehicle Vn. The rental request according to one or more embodiments of the present invention includes a user ID that specifies the user, a station for rental PR from which the shared vehicle Vn is rented, and identification information of the shared vehicle Vn. The specific information of the shared vehicle Vn may be a parking space ID that specifies a parking space, in which the shared vehicle Vn to be rented is present, among a plurality of parking spaces provided in the station for rental PR. The rental request may include a time when the shared vehicle Vn is rented, i.e. a time when starting the use. The rental request according to one or more embodiments of the present invention may or may not include a return time when the shared vehicle Vn is planned to be returned. When the planned returned time is not set in the rental request which is acquired at the time of requesting the use, the user can return the shared vehicle Vn at arbitrary timing, which is determined by the user, after the user uses the shared vehicle Vn.

Next, the transportation object vehicle specifying function executed by the control device 10 according to one or more embodiments of the present invention will be described. The control device 10 according to one or more embodiments of the present invention specifies a transportation object vehicle to be transported to a facility ST for restoring the shared vehicle so that the state information changes to a predetermined target value, on the basis of the state information of the shared vehicle Vn and a utilization rate of the shared vehicle Vn at the station PR.

When the state information of the shared vehicle Vn returned to each station PR is not within (is outside) a predetermined target range, the control device 10 according to one or more embodiments of the present invention specifies the shared vehicle Vn as a transportation object vehicle to be recovered to the facility ST. The operator recovers the transportation object vehicle to the facility ST. The operator performs treatment such that the state information of the recovered, shared vehicle Vn becomes a target value that is suitable for use. The control device 10 according to one or more embodiments of the present invention specifies the shared vehicle Vn for which the treatment is completed at the facility ST as the transportation object vehicle to be allocated to the station PR from which the user needs rental. The operator allocates the transportation object vehicle to the station PR. As will be understood, the process of specifying the transportation object vehicle may make a determination for all of the shared vehicles Vn or may also make a determination for a shared vehicle Vn that is specified in the rental request.

When the state information of the shared vehicle Vn includes the remaining amount of energy that is used to drive the shared vehicle Vn, the control device 10 according to one or more embodiments of the present invention specifies the shared vehicle Vn of which the remaining amount of energy is less than a first remaining amount threshold as the transportation object vehicle to be transported to an energy supply facility CST for supplying energy to the shared vehicle Vn. According to one or more embodiments of the present invention, the first remaining amount threshold, which is the criterion for determining whether or not the shared vehicle Vn is the transportation object vehicle, is determined in consideration that the shared vehicle Vn does not become impossible to travel during the use by the user. Although not particularly limited, the first remaining amount threshold can be determined with consideration for the largeness of an area to which the car sharing system service is applied, the interval of the stations PR, the cruising range of the shared vehicle Vn, etc. For example, when the shared vehicles Vn are electric cars, the remaining amount threshold may be, but is not limited to, 20% of the chargeable amount of battery. The shared vehicle Vn specified as the transportation object vehicle is temporarily prohibited from being used and provided again for the use after being supplied with energy.

Although not particularly limited, the control device 10 according to one or more embodiments of the present invention specifies a shared vehicle Vn of which the utilization rate at the station PR is less than a predetermined rate (probability/utilization rate), among the shared vehicles Vn of which the remaining amount of energy is not less than the first remaining amount threshold, as the transportation object vehicle to be transported to the energy supply facility CST. The control device 10 according to one or more embodiments of the present invention may specify a shared vehicle Vn of which the utilization rate at the station PR is less than a predetermined rate, among the shared vehicles Vn of which the remaining amount of energy is not less than the first remaining amount threshold and not more than a second remaining amount threshold that is higher than the first remaining amount threshold, as the transportation object vehicle to be transported to the energy supply facility CST.

The control device 10 selects the energy supply facility CST which can supply energy, in accordance with the energy source of the shared vehicle Vn of which the prohibition of rental is determined. For example, the shared vehicle Vn of which the prohibition of rental is determined is an electric car or hybrid vehicle, the control device 10 selects the energy supply facility CST which includes a charging facility. The type of energy which can be supplied is included in the facility management information 312.

Here, the utilization rate of the shared vehicle Vn at each station PR will be described. The utilization rate in one or more embodiments of the present invention is calculated using a statistical probability model on the basis of the operation history of the shared vehicle Vn at each station PR. The statistical probability model to be used is not particularly limited, and a model known at the time of filing the present application can be appropriately used. The shared vehicle Vn of a high utilization rate is highly likely to be in the operation. The utilization rate may be calculated for each station PR or may also be calculated for each shared vehicle Vn. This is because the utilization rate of the shared vehicle Vn may be determined in accordance with the geographical conditions of the station PR and may also be determined in accordance with the spec of the shared vehicle Vn itself. The utilization rate according to one or more embodiments of the present invention can be calculated over time. In one or more embodiments of the present invention, it is also possible to estimate a future utilization rate. When estimating the future utilization rate, the request to use the shared vehicle Vn (request of reservation) and the utilization rate over the same period of the past calendar may be taken into consideration.

FIG. 4 illustrates an example of the variation over time of the utilization rate. As illustrated in FIG. 4, the utilization rate varies with time. The form of variation of the utilization rate is different at each station PR. As an example, the station A illustrated in FIG. 4 is located at a residential area on a small hill and busy from morning till noon and in the evening. On the other hand, the station B is located near tourist facilities and busy during daytime.

The control device 10 acquires the utilization rate of the shared vehicle Vn which is calculated on the basis of the operation history of the shared vehicle Vn allocated to the station PR. The utilization rate of the shared vehicle Vn at each station PR can be calculated on the basis of one or more of the calendar, weather, and an event that is performed at a point near the station PR. The utilization rate of the shared vehicle Vn for rent at each station PR may be calculated by the station terminal device 700X (computer) provided at the station PR. The utilization rate is uniquely different depending on the location and environment of each station PR, such as a case in which the utilization rate increases when it rains and a case in which the utilization rate increases when it is sunny. Depending on the location and environment of each station PR, the utilization rate may increase on weekends or may increase on weekdays. For each station PR, the utilization rate may increase when an event is put on or may decrease when an event is put on. The control device 10 can acquire a correct utilization rate that is calculated on the basis of such operation history and properties of each station PR.

The operator management device 100 according to one or more embodiments of the present invention makes the operator transport the shared vehicle Vn to the facility ST on the basis of the utilization rate of the shared vehicle Vn at each station PR which is obtained in accordance with the operation history and properties of each station PR. Therefore, the shared vehicle Vn can be transported to the facility ST at appropriate timing.

As previously described, the control device 10 according to one or more embodiments of the present invention specifies, as the transportation object vehicle, a shared vehicle Vn of which the remaining amount of energy is not an amount that requires charging, but of which the utilization rate at the station PR is less than a predetermined rate at the current time or within a predetermined time period from the current time. A method for specifying the transportation object vehicle with reference to the utilization rate of FIG. 4 will be described. It is defined that the shared vehicle Vn is transported to the energy supply facility CST when the remaining charge of battery becomes less than 20%. The remaining charge of battery of the shared vehicle Vn present at the station B before 8 a.m. is 25%. Since the remaining charge of battery is not less than 20%, the shared vehicle Vn need not be immediately transported to the energy supply facility CST. Then, the "predetermined rate," which is a determination index when finely selecting the transportation object vehicle, is raised to 30%. With reference to the utilization rate illustrated in FIG. 4, the estimated value of the utilization rate from the current time of 8 a.m. to 10 a.m. two hours later is 23%, which is not more than the "predetermined rate" of 30%, and the shared vehicle Vn at the station B is selected as a recovery object vehicle.

In such a manner, according to one or more embodiments of the present invention, the shared vehicle Vn of which the utilization rate at the station PR is lower than the predetermined rate is specified as the transportation object vehicle while finely selecting the transportation object vehicle with two levels of threshold of the remaining amount of energy.

This allows preliminary energy supply to the shared vehicle Vn which need not be immediately supplied with energy but of which the operation rate is still low. Such preliminary energy supply renders the energy supply unnecessary when the operation rate becomes high, and the available time of the shared vehicle Vn can thus be increased. As a result, the operation rate of the shared vehicle Vn can be increased.

The control device 10 according to one or more embodiments of the present invention employs the maintenance state information of the shared vehicle Vn as the state information of the shared vehicle Vn and specifies the shared vehicle Vn of which the utilization rate at the station PR is less than the predetermined rate, among the shared vehicles Vn of which the maintenance state information is not within (is outside) a predefined first appropriate range in which management is not needed (the maintenance state information exceeds the upper limit of the first appropriate range or is less than the lower limit of the first appropriate range), as the transportation object vehicle to be transported to the energy supply facility CST.

With regard to the maintenance state which is not within (is outside) the first appropriate range, the control device 10 according to one or more embodiments of the present invention may further set a second upper limit/lower limit. For example, the control device 10 may specify the shared vehicle Vn of which the utilization rate at the station PR is less than the predetermined rate, among the shared vehicles Vn of which the maintenance state information exceeds the upper limit of the first appropriate range and is not more than a second upper limit higher than the upper limit of the first appropriate range, as the transportation object vehicle to be transported to the energy supply facility CST. The control device 10 may also specify the shared vehicle Vn of which the utilization rate at the station PR is less than the predetermined rate, among the shared vehicles Vn of which the maintenance state information is less than the lower limit of the first appropriate range and is not less than a second lower limit lower than the lower limit of the first appropriate range, as the transportation object vehicle to be transported to the energy supply facility CST.

The maintenance state information may be the output information (failure code) from a self-diagnostic failure determination device such as an OBD (On-board diagnostics) device, the travel distance of the shared vehicle Vn, the period of use of battery, the number of times of charging the battery, the number of times of rapidly charging the battery, etc. When the control device 10 acquires an output value of the state information in which maintenance is needed (state information outside the first appropriate range within which maintenance is not needed) from the self-diagnostic failure determination device of the vehicle, the control device 10 specifies the shared vehicle Vn as the transportation object vehicle to be transported to the maintenance facility MST. In one or more embodiments of the present invention, when the state information of the shared vehicle Vn is not within (is outside) the predetermined first appropriate range, the use of the shared vehicle Vn is temporarily suspended, and the shared vehicle Vn is transported to the maintenance facility MST to correct the state of the shared vehicle Vn within a targeted range.

In one or more embodiments of the present invention, the maintenance state information may be defined such that, as the value increases, the necessity of maintenance of the shared vehicle Vn increases, and as the value decreases, the necessity of maintenance of the shared vehicle Vn decreases. Alternatively, the maintenance state information may be defined such that, as the value decreases, the necessity of maintenance of the shared vehicle Vn increases, and as the value increases, the necessity of maintenance of the shared vehicle Vn decreases.

The control device 10 selects the maintenance facility MST in accordance with the maintenance information of the shared vehicle Vn of which the prohibition of rental is determined. For example, when the maintenance state is information that represents the time for replacement of the battery, the control device 10 selects the maintenance facility MST which is stocked with batteries for replacement. When the maintenance state is information that announces the time for periodical check, the control device 10 selects the maintenance facility MST which includes human resources and equipment for the periodical check. The facility management information 312 includes the contents of maintenance which each facility can respond to. The energy supply facility CST may be made to include maintenance equipment and function as the maintenance facility MST.

In such a manner, according to one or more embodiments of the present invention, the shared vehicle Vn of which the utilization rate at the station PR is lower than the predetermined rate is specified as the transportation object vehicle while finely selecting the transportation object vehicle on the basis of the maintenance state information. This allows preliminary maintenance of the shared vehicle Vn which does not immediately need maintenance but of which the operation rate is still low. Such preliminary maintenance renders the maintenance unnecessary when the operation rate becomes high, and the available time for the shared vehicle Vn can thus be increased. As a result, the operation rate of the shared vehicle Vn can be increased.

In one or more embodiments of the present invention, the control device 10 generates an instruction of a task for the operator at the timing when the transportation object vehicle is specified, and transmits the generated task to the operator terminal device 600X. The transportation object vehicle can be specified on the basis of the utilization rate at that timing or immediately before that timing. The utilization rate varies over time and, thus, according to one or more embodiments of the present invention, the specified transportation object vehicle is promptly transported to the facility ST. Thus, the task of transporting the transportation object vehicle to the facility ST is generated at the timing when the process to specify the transportation object vehicle is executed, and the task is transmitted to the operator terminal device 600X. Then, the operator can execute the task thereby to perform the work of energy supply and/or maintenance at appropriate timing without inconvenience to the user.

Moreover, the control device 10 of the operator management device 100 according to one or more embodiments of the present invention has a function to correct the "predetermined rate," which is a threshold for evaluating the utilization rate, in the process to specify the transportation object vehicle. When the control device 10 specifies the shared vehicle Vn of which the utilization rate at the station PR is less than the predetermined rate as the transportation object vehicle and thereafter receives a rental request for the shared vehicle Vn at the station PR, the control device 10 corrects the "predetermined rate," which is the threshold for evaluating the utilization rate, to increase. If the shared vehicle Vn is transported to the energy supply facility CST or maintenance facility MST, the user cannot use the shared vehicle Vn. In such a case, because inconvenience may possibly occur to the user who wants to use the shared vehicle Vn, the "predetermined rate" as the threshold is corrected to increase in order to make the criterion severe when specifying the transportation object vehicle next time. In other words, the shared vehicle Vn becomes difficult to be forwarded to the facility ST.

Thus, in the process to specify the transportation object vehicle, the "predetermined rate," which is the threshold for evaluating the utilization rate, is corrected with consideration for the situation of occurrence of an actual rental request thereby to allow selection of the transportation object vehicle in accordance with the actual situation of use. This can consequently prevent the situation in which there is a user who desires to rent the shared vehicle Vn, but nevertheless, the shared vehicle Vn is forwarded to the facility ST, so that the opportunity of use of the shared vehicle Vn is lost. As a result, the operation rate of the shared vehicle Vn can be improved.

The control device 10 of the operator management device 100 according to one or more embodiments of the present invention temporarily prohibits rental of the shared vehicle Vn which is specified as the transportation object vehicle on the basis of the remaining amount of energy or maintenance state. The control device 10 according to one or more embodiments of the present invention transmits a start suppression command, such as for invalidating the operation input into the ignition, to the shared vehicle Vn of which the prohibition of rental is determined. In addition, the control device 10 according to one or more embodiments of the present invention gives the user, via the user terminal device 400X, notice that the rental of the shared vehicle Vn is not permitted for the rental request 32 by the user.

Next, the operator management function executed by the control device 10 of the operator management device 100 according to one or more embodiments of the present invention will be described.

The control device 10 refers to the operator management information 313 and plans the vehicle transportation schedule and the operator schedule so that each operator can perform the assigned transportation work and maintenance work within the working hours. The control device 10 refers to the progress information acquired from the operators to adjust the vehicle transportation schedules and operator schedules of the whole operators while evaluating whether or not each operator can accomplish the assigned transportation work and maintenance work within the working hours.

The control device 10 according to one or more embodiments of the present invention specifies the operator who transports the specified transportation object vehicle to the facility ST, generates an instruction of a task to be performed by the operator, and manages the instruction and execution of the generated task.

The control device 10 according to one or more embodiments of the present invention generates an execution command for the task for the operator who transports the transportation object vehicle, and specifies the operator who transports the transportation object vehicle, on the basis of the position of the transportation object vehicle and the positional information of the operator. The control device 10 receives (acquires) the positional information of the transportation object vehicle, which is detected by the GPS receiver 210 of the onboard device 200Vn, via the communication device 220. The positional information of the transportation object vehicle may be acquired at a predetermined period or may also be acquired at the timing of receiving a command for transmitting the positional information. In addition, the control device 10 acquires the positional information of the operator, which is detected by the GPS receiver 610 of the operator terminal device 600X carried by the operator, via the communication device 620. The positional information of the operator may be acquired at a predetermined period or may also be acquired at the timing of receiving a command for transmitting the positional information.

The control device 10 according to one or more embodiments of the present invention compares the location of the specified transportation object vehicle with the locations of the operators to select an operator with a short distance from the transportation object vehicle. The location of the transportation object vehicle and the locations of the operators to be compared are those at the same time or within a predetermined time period. The operator who is capable of arriving first at the transportation object vehicle at the timing when the transportation object vehicle is specified is made to transport the transportation object vehicle. The control device 10 according to one or more embodiments of the present invention refers to the utilization rate and specifies the transportation object vehicle. The utilization rate varies over time and, thus, according to one or more embodiments of the present invention, the transportation object vehicle, which is specified on the basis of the utilization rate at the moment or within a predetermined time period, is promptly transported to the facility ST. Thus, the transportation object vehicle is promptly transported to the facility thereby to allow the operator to perform the work of energy supply and/or maintenance at appropriate timing without inconvenience to the user. In addition, the opportunity of use of the shared vehicle Vn can be ensured because the transportation object vehicle is promptly transported to a target facility ST for charging or maintenance.

The control device 10 may acquire the future positional information from the schedule for the operator who performs the task. The control device 10 treats the location at which the work is performed in the transportation schedule and work schedule of the operator management information 313 illustrated in FIG. 3D as the positional information at an estimated time for performing the work. This allows acquisition of the future positional information of the operators, and an operator suitable for performing a planned task in the future can be specified on the basis of the future positional information.

The control device 10 of the operator management device 100 according to one or more embodiments of the present invention generates an execution command for the task for the operator and transmits it to the operator's side. The execution command for the task includes the specific information of the operator in charge, the specific information of the station PR or facility ST to which the transportation object vehicle is allocated, the specific information of the transportation object vehicle, the transportation start time, the estimated transportation completion time, and the specific information of the station PR or facility ST as the destination. According to this command, it is possible to specify who (which operator) transmits which shared vehicle Vn from where to where. This command is transmitted to the operator terminal device 600X carried by the operator. The operator transports the shared vehicle Vn in accordance with the command which is output by the display or speaker of the operator terminal device 600X.

The control device 10 of the operator management device 100 according to one or more embodiments of the present invention creates an operator schedule in which the tasks for the operator are planned over time. The operator schedule is information in which the tasks are arranged over time. FIG. 5 illustrates an example of the operator schedule. As illustrated in the figure, the operator schedule includes the specific information of the operator who performs the work, the working hours of the operator, the specific information of the shared vehicle Vn as the object of the work, and the contents of the work to be performed. In this example, the contents of the work to be performed include recovering (transporting) the shared vehicle Vn, allocating (transporting) the shared vehicle Vn, charging the shared vehicle Vn, and cleaning the shared vehicle Vn. The contents of the work are not limited to them, and may include maintenance of the shared vehicle Vn. The work in association with the maintenance of the shared vehicle Vn includes check of each function of the shared vehicle Vn. The operator schedule is created for each operator over time. The control device 10 may create the task for each operator and create the operator schedule on the basis of the task or may also create the operator schedule and thereafter extract the task for each operator.

The control device 10 of the operator management device 100 according to one or more embodiments of the present invention refers to the operation state of the facility ST and creates the task for the operator and/or the operator schedule. The operation information of the facility ST is included in the facility management information 312 of the management information 31 stored in the database 30.

Specifically, the control device 10 according to one or more embodiments of the present invention refers to the facility management information 312, which includes the operation state of the facility, and generates an instruction of a task of transporting the shared vehicle Vn to a first facility ST1 when the available time for using the first facility ST1 is before an estimated execution start time for the task. The control device 10 according to one or more embodiments of the present invention refers to the facility management information 312, which includes the operation state of the facility, and generates an instruction of a task of transporting the shared vehicle Vn to a second facility ST2 when the available time for using the second facility ST2 is before an estimated arrival time at which the shared vehicle Vn is estimated to arrive at the second facility ST2. Further, the control device 10 according to one or more embodiments of the present invention refers to the facility management information 312, which includes the operation state of the facility, and generates an instruction of a task of transporting the shared vehicle Vn to a third facility ST3 when a time difference between the available time for using the third facility ST3 and the estimated arrival time at which the shared vehicle Vn is estimated to arrive at the third facility ST3 is within a predetermined time period. The operation state includes information whether or not the energy supply device such as a charger is in operation, the energy supply state, e.g. a completion time of charging which is estimated on the basis of information such as a charging ratio (the ratio of the current charged amount when the full charge is 100%), the external temperature, the number of times of charging and the period of use.

The control device 10 according to one or more embodiments of the present invention selects any one of the first facility ST1, the second facility ST2, and the third facility ST3 and creates a task of transporting the shared vehicle Vn to the selected facility. The control device 10 may select a facility that is closest to the station PR at which the shared vehicle Vn is located, from among the first facility ST1, the second facility ST2, and the third facility ST3. When the first facility ST1 is present, the control device 10 can create a task of transporting the shared vehicle Vn to the first facility ST1. When the first facility ST1 is not present but the second facility ST2 is present, the control device 10 can create a task of transporting the shared vehicle Vn to the second facility ST2. When the first facility ST1 and the second facility ST2 are not present but the third facility ST3 is present, the control device 10 can create a task of transporting the shared vehicle Vn to the third facility ST3.

By referring to the facility management information 312, which includes the operation state of the facility, to select the facility ST available before the execution start time of the task for the operator, the operator who has transported the shared vehicle Vn need not wait at the facility ST. Similarly, by selecting the facility ST available at the time when the shared vehicle Vn arrives at the facility ST, the operator who has transported the shared vehicle Vn need not wait at the facility ST. Moreover, since the facility ST to be available within the predetermined time period from when the shared vehicle Vn arrives at the facility ST is selected, the operator who has transported the shared vehicle Vn need not wait at the facility ST over the predetermined time period. Thus, the operator need not stand by at the facility and can start the work of charging or maintenance immediately after the arrival. This can minimize the time required for execution of the task. As a result, the shared vehicle Vn can be promptly allocated to the station PR to respond to the use request by the user. At the same time, the operation rate of the shared vehicle Vn can be improved.

In addition, the control device 10 according to one or more embodiments of the present invention further manages an allocating task of transporting the shared vehicle Vn for which the work is completed at the facility ST to the station PR. When making the operator perform the allocating task, the control device 10 selects a station PR to which the shared vehicle Vn can be allocated at the timing when the process is completed at the facility ST. When there is a plurality of shared vehicles Vn, a station PR at which the utilization rate is relatively high is further selected.

When the process has been completed at the energy supply facility CST is when the power feeding has been performed until the remaining amount of energy of the shared vehicle Vn becomes an appropriate value. When the process has been completed at the maintenance facility MST is when the maintenance state information of the shared vehicle Vn has become an appropriate value, i.e., when the contents of maintenance required have been performed. At this timing, the control device 10 selects a station PR having a parking area that can accept the shared vehicle Vn. Then, the control device 10 creates a task of allocation to transport the shared vehicle Vn from the facility ST to the station PR.

In a drop off-type one-way car sharing system, the user can freely select the station PR at which the user rents the shared vehicle Vn and the station PR at which the user drops off the shared vehicle Vn. Therefore, when the user arrives at a station PR, there may not be an unoccupied parking area. According to the operator management device 100 in one or more embodiments of the present invention, the station to which the shared vehicle Vn is transported is determined when the work at the facility ST is completed and then the allocation is to be started (before the start of allocation). It is therefore possible to prevent the occurrence of a situation in which the operator arrives at the station PR, but there is not an unoccupied parking area to accept the shared vehicle Vn. If the operator has to wait because the shared vehicle Vn transported by the operator is not accepted by the station PR, some loss occurs in the labor cost for the operator and the opportunities of use of the shared vehicle Vn are lost. According to one or more embodiments of the present invention, the shared vehicle Vn is moved after the station as the destination of allocation is ensured, and therefore the loss in the transportation work is eliminated. At the same time, the operation rate of the shared vehicle Vn can be improved.

Furthermore, when there is a plurality of stations PR that can accept the shared vehicle Vn, a station PR at which the utilization rate is relatively high at the timing of the start of allocation is selected as the destination. This allows the shared vehicle Vn to be allocated preferentially to the station PR at which the utilization rate is high, and the needs of the user can thus be satisfied.

The control device 10 according to one or more embodiments of the present invention compares the locations and relevant times of the operators who perform tasks, extracts tasks of which the differences between the locations and between the relevant times are less than predetermined values, and selects one operator from among the operators who perform the extracted tasks. For the one operator, the control device 10 generates an another task of making other operator than the one operator ride with the one operator on the shared vehicle Vn transported by the one operator, and transmits an execution command for the task to the operator terminal device 600X at the one operator. In accordance with the task of riding with the other operator, the one operator makes the other operator ride with the one operator on the transportation object vehicle transported by the one operator.

The control device 10 of the operator management device 100 according to one or more embodiments of the present invention obtains estimated travel paths of tasks to transport the transportation object vehicles and the time of passing through a certain point on each of the estimated travel paths. When the estimated travel paths of the tasks to transport the transportation object vehicles cross at a point, the control device 10 extracts tasks of which the time difference in passing through the crossing point is less than a predetermined value. An operator who performs the task included in the extracted tasks is expected to encounter another operator at the crossing point of the estimated travel paths, and the control device 10 therefore plans for the operators to ride with one another. The number of operators who ride with one another may be two or more and is not limited. The transportation object vehicle on which the operators ride can be appropriately selected in accordance with the remaining amount of energy of the transportation object vehicle and the necessity of maintenance. The operator who drives the transportation object vehicle can be appropriately selected on the basis of the location at which the task of each operator is performed.

The task of riding with another according to one or more embodiments of the present invention includes the another task in which one operator makes another operator ride with the one operator from the point at which the one operator gets on the shared vehicle Vn to the point at which the one operator gets/drops off the shared vehicle Vn. In addition, the task of riding with another according to one or more embodiments of the present invention includes a task from the point at which one operator gets on the shared vehicle Vn via the point at which the task for another operator is performed to the point at which the one operator gets off the shared vehicle Vn. In this case, the one operator makes the other operator get off at the point at which the task for the other operator is performed. The control device 10 can set a plurality of via-points in accordance with the locations at which the tasks of the operators who ride with the one operator on the transportation object vehicle.

Thus, when the travel paths for the operators who transport the shared vehicles Vn are partially overlapped, the operators are made to ride with one another on one shared vehicle Vn, and the work and energy required for moving the operators can be saved. This results in a reduced cost for transporting the shared vehicles Vn.

The control device 10 of the operator management device 100 according to one or more embodiments of the present invention transmits the generated task to the operator terminal device 600X. The operator performs the task acquired via the operator terminal device 600X.

In addition, the control device 10 of the operator management device 100 according to one or more embodiments of the present invention exchanges information with the operator terminal device 600X to manage the progress of the task for the operator and/or the operator schedule. The progress of the task for the operator and/or the operator schedule is managed in the operator terminal device 600X carried by the operator. FIG. 6 illustrates an example of the management screen for the progress of the task for the operator and/or the operator schedule.

As illustrated in FIG. 6, the operator terminal device 600X according to one or more embodiments of the present invention presents the task for the operator and/or the operator schedule on the display. In the example illustrated in FIG. 6, the operator terminal device 600X according to one or more embodiments of the present invention presents (I) a task of recovering the shared vehicle Vn to the facility ST, (II) a task of charging at the energy supply facility CST, (III) a task of allocating the shared vehicle Vn to the station PR, (IV) a task of making another operator ride with the operator on the vehicle, and (V) a task of making the other operator riding with the operator get off (dropping off the other operator riding with the operator) at an indicated location.

Although not particularly limited, as for the vehicle transporting (recovering) task (I), the operator terminal device 600X according to one or more embodiments of the present invention presents the ID and vehicle state of the shared vehicle Vn as the object of transporting (recovering). After starting this work of recovering the vehicle, the operator touches the check box CB to input the check. When the check is input, the time of input is stamped. Similarly, the operator confirms the time of getting on the transportation object vehicle and then inputs the check on the check box. Similarly, upon confirmation of the estimated arrival time, the operator inputs the check when actually arriving at the facility ST. When each check is input, the time of check is stamped. The input of check and the time of check are transmitted to the operator management device 100 via the communication device 620 of the operator terminal device 600X. The operator management device 100 records the acquired progress information into the operator management information 313. For each information item, processes of the input, transmission, acquisition and update of the progress information are performed in the same way. Through this operation, the operator management device 100 determines whether the task and/or schedule for the operator progress as planned and whether some delay does not occur in the transportation work, and can manage the work of the operator.

As for the charging task (II), the operator checks the start time and finish time of charging. As for the vehicle allocating (transporting) task (III), the operator confirms the IDs of the facility and workshop at which the shared vehicle Vn as the object of the allocating work is located and the time of getting on the shared vehicle Vn and then inputs the check after starting the allocating work. The operator further confirms the IDs of the station and parking area to be the destination for allocating the shared vehicle Vn and the finish time. Then, the operator inputs the check after completion of the allocating work.

As for the share-riding task (IV), the operator confirms the ID of another operator who rides with the operator, the time when they get on the vehicle, and the IDs of the facility and workshop or the IDs of the station and parking area. Then, the operator inputs the check after making the other operator as the object of share-riding ride with the operator.

As for the dropping-off task (V), the operator confirms the time of making the other operator for share-riding get off the vehicle, and the IDs of the facility and workshop or the IDs of the station and parking area. Then, the operator inputs the check after making the other operator as the object of share-riding get off at a given location.

The operator terminal device 600X receives the above-described input of the progress information of the presented task for the operator and/or the operator schedule and acquires it. The acquired progress information is transmitted to the operator management device 100 via the communication device 620. The operator management device 100 stores the received progress information into the operator management information 313.

Here, the operator terminal device 600X included in an operator management system 100' according to one or more embodiments of the present invention will be described. The operator terminal device 600X executes programs for managing the operators. The programs executed by the operator terminal device 600X according to one or more embodiments of the present invention are downloaded to the operator terminal device 600X via an electric communication line and stored in the operator terminal device 600X. As will be understood, the programs according to one or more embodiments of the present invention may be those which are provided from an ASP (Application Service Provider) via an electric communication line and executed in the operator terminal device 600X.

The programs according to one or more embodiments of the present invention cause the operator terminal device 600X to execute a task presentation function and a task progress reception function. The operator terminal devices 600X to 600Y according to one or more embodiments of the present invention each include an input device 610 that receives an input of the progress information of the task for each operator. The task presentation function is used to present the task generated by the operator management device 100 to the operator via letters, images, and/or sound. The task progress reception function is used to receive the input of information that represents the progress of the previously-presented task. The information of which the input is received is transmitted to the operator management device 100 via the communication device 620. The operator management device 100 stores the received progress information into the operator management information 313. The operator management device 100 compares the planned task and schedule with the progress information to detect the task and schedule which cannot be executed. The operator management device 100 cancels the task and schedule which are determined unable to be executed, and plans again a new task and schedule. This operation can prevent the situation in which the task and schedule are not actually executed.

Figure 7:
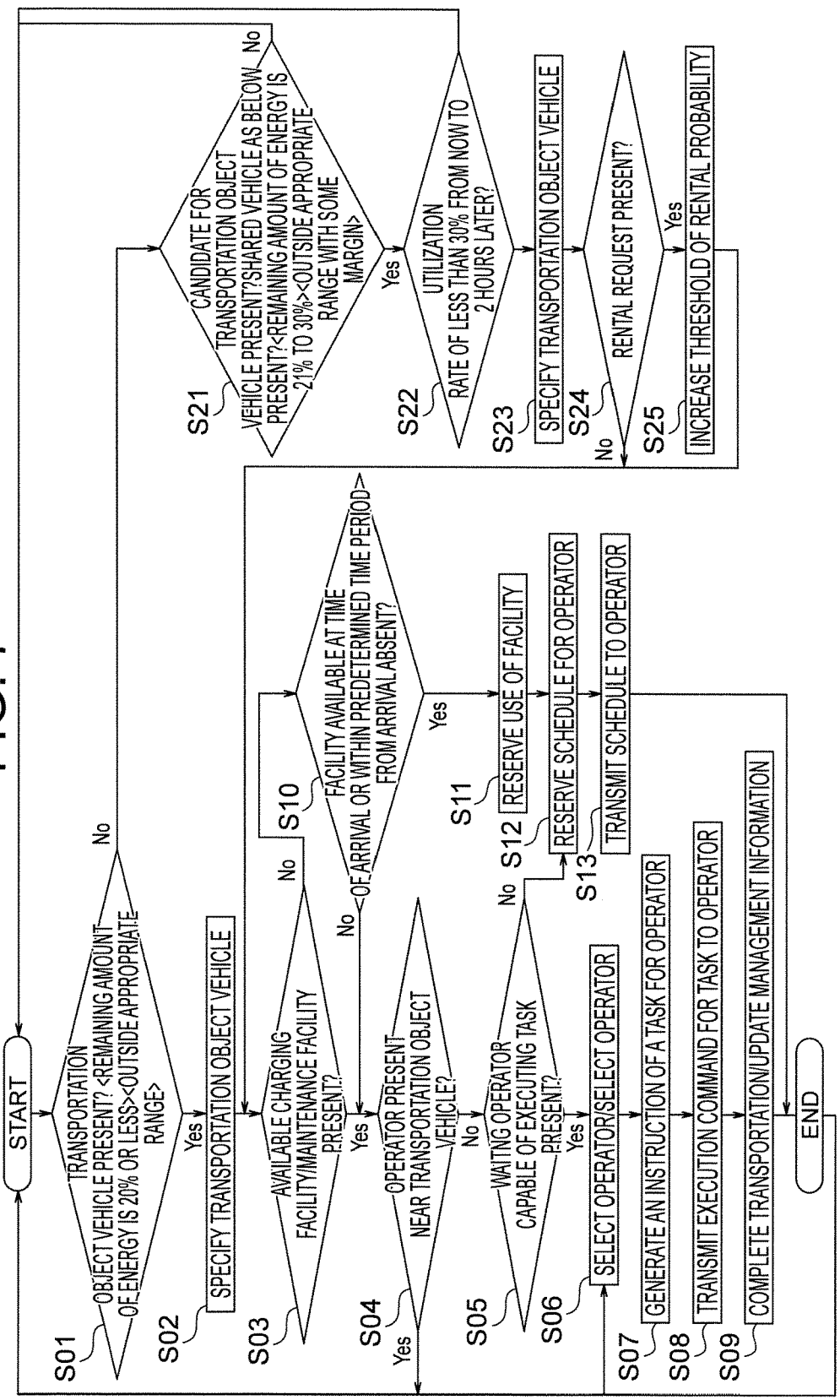
FIG. 7 is a flowchart illustrating the control procedure of the operator management device according to one or more embodiments of the present invention.

With reference to FIG. 7, the control procedure of a management process for the shared vehicle Vn in the operator management system 1000 according to one or more embodiments of the present invention will be described below.

FIG. 7 is a flowchart illustrating the control procedure of the operator management device 100 according to one or more embodiments of the present invention.

In an initiation process, the control device 10 of the operator management device 100 according to one or more embodiments of the present invention acquires the rental request from the user. The user terminal device 400X executes the rental request reception function to receive the input of the rental request. The rental request includes a rental request to request the use of the shared vehicle Vn by the user. The rental request received by the user terminal device 400X is transmitted to the control device 10 of the operator management device 100.

In step S01, the control device 10 of the operator management device 100 refers to the vehicle state management information 311 of the management information 31 and extracts the shared vehicle Vn that is a transportation object to the facility (energy supply facility CST, maintenance facility MST). In an example of the extraction scheme, the control device 10 reads the remaining charge of battery included in the vehicle state management information 311 and extracts the shared vehicle Vn of which the remaining charge of battery is less than 20% of the chargeable amount. According to one or more embodiments of the present invention, the threshold of the remaining charge of battery, which is the criterion for determination of the transportation object vehicle, may be set with an added margin so that the shared vehicle Vn does not become impossible to travel due to the remaining charge of battery becoming zero during the use. The threshold of the remaining charge of battery for determining the transportation object vehicle is 20% in this example, but is not limited thereto. Similarly, the control device 10 reads the maintenance state information included in the vehicle state management information 311 and extracts the shared vehicle Vn of which the maintenance state information is not within (is outside) the appropriate range. As will be understood, the control device 10 may extract the shared vehicle Vn as the transportation object to the facility at a predetermined period or may also extract the shared vehicle Vn as the transportation object among the shared vehicles Vn which the user requests to rent.

In step S02, the control device 10 specifies the transportation object vehicle (shared vehicle Vn) which needs transportation to the facility, and adds a flag indicating it to the vehicle state management information 311. The control device 10 determines that the rental of the specified transportation object vehicle is prohibited, and adds a flag indicating the prohibition of rental to the vehicle state management information 311. The shared vehicle Vn to which the rental prohibition flag is added is subjected to a process to temporarily make the shared vehicle Vn unavailable, such as by the operation control for the ignition key.

In step S03, the control device 10 searches for a facility that can accept the shared vehicle Vn. The control device 10 according to one or more embodiments of the present invention extracts a facility that has an unoccupied workshop DC. The control device 10 refers to the facility management information 312 of the management information 31 and acquires information regarding the operation state of the facility. The control device 10 extracts a facility having a workshop DC that is currently available, on the basis of the facility management information 312 as for the facility of which the distance from the station PR of the shared vehicle Vn as the transportation object is less than a predetermined value. When there is a facility having a workshop DC that is currently available, the process proceeds to step S04.

When there is not a facility having a workshop DC that is currently available, the control device 10 extracts a facility of which the available time for using the workshop DC in the facility is before an estimated arrival time at which the shared vehicle Vn is estimated to arrive at the facility. When there is not a facility having a workshop DC that is available at the time of arrival of the shared vehicle Vn, the control device 10 extracts a facility of which the time difference between the available time for using the workshop DC in the facility and the estimated arrival time at which the shared vehicle Vn is estimated to arrive at the facility is within a predetermined time period.

In other words, the control device 10 extracts first a facility having a workshop DC that is currently available, extracts second a facility having a workshop DC that is available at the time of arrival of the shared vehicle Vn, and extracts third a facility having a workshop DC that is available within the predetermined time period from the time of arrival of the shared vehicle Vn. This operation allows extraction of a facility that is highly available and ensured that the operator need not wait or waits for a while within the predetermined time of period, and the facility can accept the transportation object vehicle. For example, when the energy supply facility CST does not have an unoccupied charging device BT, the control device 10 searches for a facility having a charging device BT that is available within a time period (e.g. 20 minutes) required for the transportation. When there is not a charging device BT that becomes unoccupied within a time period (e.g. 20 minutes) required for the transportation, the control device 10 searches for a facility having a charging device BT that becomes unoccupied within a time period (e.g. 30 minutes) to which the waiting time is added. As will be understood, the time period required for the transportation can be appropriately set in accordance with the distance to the facility, the type of road of the path to the facility, the average speed on the path to the facility, the degree of traffic jam on the path to the facility, etc. The waiting time acceptable for the user can be appropriately set in accordance with the season, the air temperature, and the ambient environment.

Next, in step S04, the control device 10 determines whether or not there is an operator who can perform the transportation work. The control device 10 searches for an operator who is located within a predetermined distance from the location at which the transportation object vehicle is present. The positional information of the operator is detected by the GPS receiver 620. The control device 10 extracts the operator who is located within the predetermined distance from the transportation object vehicle, and refers to the task and/or schedule for the operator. The control device 10 determines whether or not the operator can transport the transportation object vehicle, in addition to or as substitute for the task and/or schedule which have already been commanded. When a determination is made that the operator can perform the transportation task for the transportation object vehicle, the operator is selected as an operator in charge. The control device 10 refers to the progress information and current position of the operator management information 313 to preferentially select the operator who is located near the shared vehicle Vn as the transportation object.

In step S04, when an operator who can perform the task as for the transportation object vehicle is not present in the vicinity thereof, the process proceeds to step S05 in which the control device 10 searches for an operator who is present at a location of which the distance from the transportation object vehicle exceeds the predetermined distance, but can perform the task.

In step S106, the control device 10 selects the operator who is searched for in step S04, S05 as an operator in charge who performs the task as for the transportation of the transportation object vehicle.

In step S06, the control device 10 determines whether or not the transportation object vehicle driven by one operator can accept another operator who rides with the one operator. The control device 10 compares the locations and relevant times of operators when performing the task, extracts tasks of which the differences between the locations and between the relevant times specified in the task are less than predetermined values, and determines that the operators who perform these tasks can ride with one another. Then, the control device 10 selects one operator from among the operators who can ride with one another, and imposes the one operator on the task that another operator or other operators ride with the one operator on the transportation object vehicle. The control device 10 records the ID of the operator as the performer of the task into the operator management information and the facility management information 312.

Subsequently, in step S07, the control device 10 creates the task and schedule for the operator. When there is a task that commands share-riding, this task is included therein. Then, in step S08, the control device 10 transmits an execution command for the task to the operator terminal device 600X carried by the operator.

In step S09, the control device 10 refers to the progress information input by the operator to the operator terminal device 600X to confirm the progress of the task. The above is the process procedure when the determination result in the flowchart is "Yes," i.e. the process to make the operator transport the shared vehicle Vn.

Referring again to step S01, the control device 10 according to one or more embodiments of the present invention extracts a shared vehicle Vn that should be immediately transported to the facility ST under the condition that "the remaining amount of energy of the shared vehicle Vn is less than a predetermined remaining amount threshold" and/or "the maintenance state information of the shared vehicle Vn is not within (is outside) a predefined appropriate range in which management is not needed." As an example, the control device 10 according to one or more embodiments of the present invention selects "a shared vehicle Vn of which the remaining charge of battery is 20% or less," "a shared vehicle Vn of which the period of use from the previous check is 6 months or more," and/or "a shared vehicle Vn of which the travel distance from the previous check is 5,000 km or more."

In step S101, when a determination is made that the above condition is not satisfied, the process proceeds to step S21. In step S21, the control device 10 extracts a shared vehicle Vn of which the remaining amount of energy is not less than the remaining amount threshold. For this operation, the upper limit of the remaining amount of energy may be defined. In other words, the control device 10 may extract a shared vehicle Vn of which the remaining amount of energy is not less than a first remaining amount threshold and is less than a second remaining amount threshold. As an example, the control device 10 extracts "a shared vehicle Vn of which the remaining charge of battery is 21% to 30%." Similarly, in step S21, the control device 10 extracts a shared vehicle Vn of which the maintenance state information is within the appropriate range. For this operation, the range of maintenance state may be defined. In other words, the control device 10 may extract a shared vehicle Vn of which the maintenance state information is not less than a first threshold and is less than a second threshold. As an example, the control device 10 extracts "a shared vehicle Vn of which the period of use from the previous check is 4 months or more and less than 6 months" and/or "a shared vehicle Vn of which the travel distance from the previous check is 4,000 km or more and less than 5,000 km."

Next, in step S22, the control device 10 finely selects the shared vehicle Vn of which the utilization rate during the treatment time period (e.g. 2 hours) from the timing of determination in step S21 is less than a predetermined rate. As an example, the control device 10 extracts a shared vehicle Vn of which the utilization rate during a predetermined time period (e.g. 2 hours) from the time of determination is less than 30%.

In step S23, the control device 10 specifies the transportation object vehicle which satisfies the condition of steps S21 and S22.

After specifying the transportation object vehicle, in step S24, the control device 10 determines whether or not the rental request for the shared vehicle Vn at the station PR is present. When the rental request is present, the process proceeds to step S25 in which the threshold of utilization rate used previously in the process of finely selecting the transportation object vehicle is corrected to be high. The control device 10 corrects the threshold to be high, thereby to suppress the transportation object vehicle from being specified. The transportation object vehicle is transported to the facility ST and therefore cannot be provided for use by the user. The threshold for rental request used in the next process is corrected. The transportation object vehicle becomes difficult to be specified by correcting the threshold for rental request to be high, and the transportation object vehicle can therefore be finely selected in accordance with the actual utilization rate. As a result, it is possible to avoid an erroneous determination that the shared vehicle Vn is transported to the facility ST despite the presence of the request for use.

In step S24, when the rental request is not present, the process of step S03 and subsequent steps are performed for the specified transportation object vehicle.

Although not illustrated in this flowchart, after the process at the facility ST is completed, the shared vehicle Vn of which the state information becomes a predetermined target value is transported to each station PR. The operator management device 100 according to one or more embodiments of the present invention further manages a task of transporting the shared vehicle Vn for which the work is completed at the facility ST to the station PR. The control device 10 selects a station PR to which the shared vehicle Vn can be allocated at the timing when the process is completed at the facility ST and at which the utilization rate of the shared vehicle Vn is relatively high. Then, the control device 10 generates a task of allocation to transport the shared vehicle Vn from the facility ST to the station PR.

The control device 10 of the operator management device 100 according to one or more embodiments of the present invention calculates the utilization rate at each station PR within 30 minutes from the timing when the process (charging/maintenance) at the facility ST is completed. The control device 10 may refer to a preliminarily-calculated utilization rate at each PR included in the vehicle state management information 311. The control device 10 specifies the station PR at which the utilization rate is highest, and confirms the number of rentable shared vehicles Vn among the shared vehicles Vn allocated to the station PR. When the number of available shared vehicles Vn allocated to the station PR is less than a predetermined number or the ratio of the number is less than a predetermined ratio, the control device 10 specifies the station PR as a station PR to which the shared vehicle Vn completed with the process is to be allocated.

The control device 10 may make a group of adjacent stations PR and evaluate the number of available shared vehicles Vn. Also in the task of allocating the shared vehicles Vn, the previously-described task for share-riding with another operator may be added.

According to the operator management device 100 according to one or more embodiments of the present invention, one or more of the following effects can be obtained. The below are merely examples of possible effects, and do not limit the scope of the claims in any way.

(1) In a car sharing system that allows users to use shared vehicles allocated to stations, the operator management device 100 according to one or more embodiments of the present invention, on the basis of state information of the shared vehicle Vn and a utilization rate of the shared vehicle Vn at the station, specifies a transportation object vehicle to be transported to a facility ST for restoring the shared vehicle so that the state information changes to a predetermined target value, and makes an operator transport the transportation object vehicle to the facility ST.

According to one or more embodiments of the present invention, the operator is made to transport the shared vehicle Vn specified on the basis of the state information and utilization rate of the shared vehicle Vn to the facility, and the shared vehicle Vn can thereby be transported to the facility ST at appropriate timing. It is therefore possible to maintain the state of the shared vehicle to be good and avoid the occurrence of a trouble that the user cannot use the shared vehicle Vn. As a result, the operation rate of the shared vehicle can be improved.

(2) The operator management device 100 according to one or more embodiments of the present invention specifies the shared vehicle Vn of which the remaining amount of energy is a value that exceeds a remaining amount threshold and the utilization rate at the station PR is less than a predetermined rate, as the transportation object vehicle. Thus, the shared vehicle Vn of which the utilization rate at the station PR is lower than the predetermined rate is specified as the transportation object vehicle while finely selecting the transportation object vehicle on the basis of the threshold of the remaining amount of energy.

This allows preliminary energy supply before the shared vehicle Vn comes into a state in which energy has to be immediately supplied and when the operation rate is still low. Such preliminary energy supply at a low operation rate renders the energy supply unnecessary when the operation rate becomes high. This operation reduces the unavailable time of the shared vehicle Vn due to energy supply and can increase the operation rate of the shared vehicle Vn.

(3) The operator management device 100 according to one or more embodiments of the present invention specifies the shared vehicle Vn of which the maintenance state information is within an appropriate range and the utilization rate at the station PR is less than a predetermined rate, as the transportation object vehicle.

This allows preliminary maintenance before the shared vehicle Vn comes into a state in which the maintenance has to be immediately performed and when the operation rate is still low. Such preliminary maintenance at a low operation rate renders the maintenance unnecessary when the operation rate becomes high. This operation reduces the unavailable time of the shared vehicle Vn due to maintenance and can increase the operation rate of the shared vehicle Vn.

(4) When the operator management device 100 according to one or more embodiments of the present invention specifies the shared vehicle Vn of which the utilization rate at the station PR is less than the predetermined rate as the transportation object vehicle and thereafter receives the rental request, the operator management device 100 corrects the predetermined rate for evaluating the utilization rate to increase. The "predetermined rate," which is a threshold for evaluating the utilization rate in the process to specify the transportation object vehicle, is corrected in accordance with the presence or absence of the actual rental request thereby to allow selection of the transportation object vehicle in consideration of the actual situation of use.

This can consequently prevent the situation in which there is a user who desires to rent the shared vehicle Vn, but nevertheless, the shared vehicle Vn is forwarded to the facility ST, so that the opportunity of use of the shared vehicle Vn is lost. As a result, the operation rate of the shared vehicle Vn can be improved.

(5) When the operator management device 100 according to one or more embodiments of the present invention makes the operator transport the shared vehicle Vn to the facility ST on the basis of one or more information items of the operation history of the shared vehicle Vn allocated to the station PR, the calendar, the weather, and an event that is performed at a point near the station PR. Therefore, the shared vehicle Vn can be transported to the facility ST at appropriate timing.

(6) The operator management device 100 according to one or more embodiments of the present invention selects an operator relatively close to the location of the transportation object vehicle and makes the operator perform the task in association with the transportation.

Therefore, the time required for the transportation is reduced and the cost for transportation of the transportation object vehicle can be reduced. Moreover, the opportunities of use of the shared vehicle Vn can be ensured because the transportation object vehicle can be promptly transported to the facility ST for charging and maintenance.

(7) The operator management device 100 according to one or more embodiments of the present invention generates an operator schedule in which the tasks for the operator in association with transportation are planned over time. Therefore, redundant works, vacant time and the like are reduced, and the operator can be made to perform the tasks without any loss.

(8) The operator management device 100 according to one or more embodiments of the present invention refers to the facility management information 312, which includes the operation state of the facility, and selects the facility ST available before the execution start time of the task for the operator in association with transportation, and thereby the operator who has transported the shared vehicle Vn need not wait at the facility ST. Similarly, by selecting the facility ST available at the time when the shared vehicle Vn arrives at the facility ST, the operator who has transported the shared vehicle Vn need not wait at the facility ST. Moreover, since the facility ST to be available within the predetermined time period from when the shared vehicle Vn arrives at the facility ST is selected, the operator who has transported the shared vehicle Vn need not wait at the facility ST over the predetermined time period.

Thus, the operator does not wait for a long time after having arrived at the facility and can start the work of charging or maintenance. This can minimize the time required for execution of the task. As a result, the shared vehicle Vn can be promptly allocated to the station PR to respond to the use request by the user. At the same time, the operation rate of the shared vehicle Vn can be improved.

(9) The operator management device 100 according to one or more embodiments of the present invention makes the operator transport the shared vehicle Vn for which the work is completed at the facility ST to the station PR to which the shared vehicle Vn can be allocated at the time of completion of the work and at which the utilization rate of the shared vehicle Vn is relatively high.

Therefore, the station to which the shared vehicle Vn is transported is determined when the work is completed and then the allocation is to be started (before the start of allocation). It is thus possible to prevent the occurrence of a situation in which the operator arrives at the station PR, but there is not an unoccupied parking area to accept the shared vehicle Vn. That results in suppression of the loss in the labor cost for the operator, and the operation rate of the shared vehicle can be improved.

(10) The operator management device 100 according to one or more embodiments of the present invention compares the locations and relevant times of operators when performing the task. When the travel paths for the operators who transport the shared vehicles Vn are partially overlapped, the operators are made to ride with one another on one shared vehicle Vn, and the work and energy required for moving the operators can be saved. This results in a reduced cost for transporting the shared vehicles Vn.

(11) In the operator management system 1000 according to one or more embodiments of the present invention, the operator terminal device 600X receives the input of progress information of the task or schedule for the operator and transmits the progress information to the operator management device 100. Referring to the progress information, the control device 10 of the operator management device 100 can adjust the operator schedules, which include the tasks, transportation schedules and work schedules, of the whole operators while evaluating whether or not each operator can accomplish the assigned transportation work and maintenance work within the working hours.

(12) Similar action and effect to the one or more of the above can be realized by an operator management method according to one or more embodiments of the present invention.

Embodiments heretofore explained are described to facilitate understanding of the present invention and are not described to limit the present invention. Therefore, it is intended that the elements disclosed in the above embodiments include all design changes and equivalents to fall within the technical scope of the present invention.

In the present description, the operator management device 100 is exemplified as a form of the operator management device according to one or more embodiments of the present invention, but the present invention is not limited to this.

In the present description, the operator management device 100 comprising the control device 10 (computer) that has a CPU 11, a ROM 12, and a RAM 13 is exemplified as a form of the operator management device according to one or more embodiments of the present invention, but the present invention is not limited to this.

In the present description, the operator management device 100 comprising the control device 10 that executes the vehicle state acquisition function, the transportation object vehicle specifying function, and the operator management function is exemplified as a form of the operator management device that has the vehicle state acquisition unit, the transportation object vehicle specifying unit, and the operator management unit according to one or more embodiments of the present invention, but the present invention is not limited to this.

In the present description, the operator management system 100' comprising the operator management device 100 and the operator terminal device 600X is exemplified as a form of the operator management system according to one or more embodiments of the present invention, but the present invention is not limited to this.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF REFERENCE NUMERALS

1000 Operator management system
100 Operator management device
100' Operator management system
10 Control device
11 CPU
12 ROM
13 RAM
20, 220, 420, 520, 620 Communication device
30 Database
31 Management information
311 Vehicle state management information
312 Facility management information
313 Operator management information
314 Station management information
32 Rental request
V1 to Vn Shared vehicle
110 Shared vehicle management device
200, 200V1 to 200Vn On-board device
400, 400X to 400Y User terminal device
500, 500X to 500Y Facility terminal device
600, 600X to 600Y Operator terminal device
PR Station (Port)

The invention claimed is:

1. An electronic car sharing determination method for a plurality of shared vehicles allocated to stations using a shared vehicle management device in communication with an onboard device of a first shared vehicle and an operator terminal device, the method comprising:
determining, by the onboard device, a state information of the first shared vehicle including an energy amount sensed by an energy amount sensor of the first shared vehicle;
acquiring, by the shared vehicle management device, the state information of the first shared vehicle of the plurality of shared vehicles from the onboard device;
calculating, by the shared vehicle management device, a utilization rate of the first shared vehicle;
determining, by the shared vehicle management device, that a transportation object vehicle to be transported to an energy supply facility for restoring is the first shared vehicle so that the state information changes to a predetermined target value, the determination being made on a basis of the energy amount of the first shared vehicle being less than a predetermined remaining amount threshold and the utilization rate is less than a predetermined rate, among the plurality of shared vehicles of which the remaining amount of energy is more than the predetermined remaining amount threshold;
calculating, by the onboard device, the state information further including a remaining amount of energy used to drive the first shared vehicle to the energy supply facility;
acquiring, from the onboard device of the first shared vehicle that further includes a Global Positioning System (GPS) receiver, a first current position of the shared vehicle;
acquiring, from a second GPS receiver in the operator terminal device, a second current position of the operator terminal device;
determining, by the shared vehicle management device and using the first current position and the second current position, the operator terminal device based on the device being within a short distance from the transportation object vehicle as the operator device to receive an electronic task instruction to transport the transportation object vehicle;
transmitting, by the shared vehicle management device, the electronic task instruction to the operator terminal device to transport the transportation object vehicle to the energy supply facility; and
receiving, by the shared vehicle management device, execution progress information of the electronic task instruction from the operator terminal device until the transportation object vehicle arrives to the energy supply facility.

2. The method according to claim 1,
wherein, when a rental request is received by the shared vehicle management device for the shared vehicle at the station after determining the first shared vehicle of which the utilization rate at the station is less than the predetermined rate, a further determination corrects the predetermined rate, which is a threshold for evaluating the utilization rate, to be high.

3. The method according to claim 1,
wherein the utilization rate of the first shared vehicle is calculated on a basis of one or more information items among an operation history of the first shared vehicle allocated to the station, calendar, weather, and an event that is performed at a point near the station.

4. The method according to claim 1, further comprising:
generating, by the shared vehicle management device, a schedule for the operator terminal device in which the electronic task instruction for the operator terminal device is planned over time.

5. The method according to claim 1, further comprising:
determining, by the shared vehicle management device, an operation state of the energy supply facility and generating, by the shared vehicle management device, the electronic task instruction of the task of transporting the shared vehicle to the energy supply facility:
when an available time for using the energy supply facility is before a planned time to start execution of the task,
when the available time for using the energy supply facility is before an estimated arrival time at which the first shared vehicle is estimated to arrive at the energy supply facility, or
when a time difference between the available time for using the energy supply facility and the estimated arrival time at which the first shared vehicle is estimated to arrive at the energy supply facility is within a predetermined time period.

6. The method according to claim 1, further comprising:
monitoring, by the shared vehicle management device, the execution of the task of transporting the first shared vehicle for which the work at the energy supply facility is completed to the station;
selecting, by the shared vehicle management device, the station to which the first shared vehicle can be allocated at a time when the work is completed and at which the utilization rate of the first shared vehicle is relatively high; and
generating, by the shared vehicle management device, the electronic task instruction of the task of allocation to transport the shared vehicle from the energy supply facility to the station.

7. The method according to claim 1, further comprising:
comparing, by the shared vehicle management device, locations and relevant times of operator terminal devices when performing the task;
extracting, by the shared vehicle management device, tasks of which differences between the locations and between the relevant times specified in the task are less than predetermined values;
selecting, by the shared vehicle management device, one operator terminal device from among a plurality of operator terminal devices instructed to perform the extracted tasks;
generating, by the shared vehicle management device, another electronic task instruction of making a second operator terminal device ride with the operator terminal device on the first shared vehicle; and
transmitting, by the shared vehicle management device, the another electronic task instruction to the second operator terminal device.

* * * * *